(12) United States Patent
Fukui

(10) Patent No.: US 12,634,581 B2
(45) Date of Patent: May 19, 2026

(54) APPARATUS AND METHOD FOR SENSOR POSTURE STABILIZATION IN A MOBILE APPARATUS

(71) Applicant: SONY GROUP CORPORATION, Tokyo (JP)

(72) Inventor: Akira Fukui, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 7 days.

(21) Appl. No.: 18/694,285

(22) PCT Filed: Aug. 9, 2022

(86) PCT No.: PCT/JP2022/030386
§ 371 (c)(1),
(2) Date: Mar. 21, 2024

(87) PCT Pub. No.: WO2023/058322
PCT Pub. Date: Apr. 13, 2023

(65) Prior Publication Data
US 2025/0142214 A1      May 1, 2025

(30) Foreign Application Priority Data
Oct. 4, 2021      (JP) ................................. 2021-163656

(51) Int. Cl.
*H04N 23/68*          (2023.01)
(52) U.S. Cl.
CPC ....... *H04N 23/6812* (2023.01); *H04N 23/687* (2023.01)
(58) Field of Classification Search
CPC ..... H04N 23/6812; H04N 23/687; G05D 1/02
See application file for complete search history.

(56) References Cited

U.S. PATENT DOCUMENTS

2009/0195557 A1* 8/2009 Nakamura ................ G06T 7/80
                                                                         345/632
2017/0069107 A1* 3/2017 Kobayashi ................ G06T 7/74
                                    (Continued)

FOREIGN PATENT DOCUMENTS

JP          08-339227 A        12/1996
JP       2006-262009 A          9/2006
                              (Continued)

OTHER PUBLICATIONS

International Search Report and Written Opinion of PCT Application No. PCT/JP2022/030386, issued on Oct. 11, 2022, 08 pages of ISRWO.

*Primary Examiner* — Padma Haliyur
(74) *Attorney, Agent, or Firm* — CHIP LAW GROUP

(57)          ABSTRACT

Provided is a mobile apparatus that includes an environment observation unit that generates environment information on the basis of a sensing result of a sensor, a moving mechanism control unit that generates a moving mechanism control command value for controlling a motion of a moving mechanism and outputs the moving mechanism control command value to the moving mechanism, a sensor posture estimation unit that estimates, on the basis of the environment information, a posture of a sensor, and a sensor posture stabilization unit that generates, on the basis of the moving mechanism control command value, a sensor posture control command value for stabilizing the posture of the sensor outputs the sensor posture control command value to the sensor posture control mechanism to stabilize the posture of the sensor.

11 Claims, 13 Drawing Sheets

(56)     References Cited

U.S. PATENT DOCUMENTS

| 2019/0248017 A1* | 8/2019 | Shimizu | G05D 1/0274 |
| 2020/0041539 A1* | 2/2020 | Nakaoka | G01P 21/00 |
| 2020/0342618 A1* | 10/2020 | Hirama | G01P 15/08 |
| 2020/0409317 A1* | 12/2020 | Kimura | G05B 13/042 |
| 2021/0262804 A1* | 8/2021 | Ohira | G01C 25/00 |
| 2023/0001581 A1* | 1/2023 | Saito | B25J 17/0266 |

FOREIGN PATENT DOCUMENTS

| JP | 2010-216058 A | 9/2010 |
| JP | 2018-032790 A | 3/2018 |
| JP | 2018-164468 A | 10/2018 |
| JP | 2021-136009 A | 9/2021 |

\* cited by examiner

APPARATUS AND METHOD FOR SENSOR POSTURE STABILIZATION IN A MOBILE APPARATUS

CROSS REFERENCE TO RELATED APPLICATIONS

This application is a U.S. National Phase of International Patent Application No. PCT/JP2022/030386 filed on Aug. 9, 2022, which claims priority benefit of Japanese Patent Application No. JP 2021-163656 filed in the Japan Patent Office on Oct. 4, 2021. Each of the above-referenced applications is hereby incorporated herein by reference in its entirety.

TECHNICAL FIELD

The present disclosure relates to a mobile apparatus that moves in an automated manner in an environment, an information processing program that is executed by the mobile apparatus, and an information processing method that is executed by the mobile apparatus.

BACKGROUND ART

As a mobile apparatus that moves in an automated manner in an environment, an automated driving vehicle, an automated guided vehicle (AGV), a drone, a pet-type quadrupedal robot, or the like is known. Such a mobile apparatus senses the environment using a sensor such as an image sensor and moves in an automated manner in the environment on the basis of the environment information obtained by sensing.

CITATION LIST

Patent Literature

Patent Literature 1: Japanese Patent Application Laid-open No. 2010-216058
Patent Literature 2: Japanese Patent Application Laid-open No. 2018-164468
Patent Literature 3: Japanese Patent Application Laid-open No. 2018-32790

DISCLOSURE OF INVENTION

Technical Problem

The sensor of the mobile apparatus that moves in an automated manner in the environment is likely to cause noise associated with the motion of the mobile apparatus itself. For example, when the sensor is fixed to the frame of the mobile apparatus, shake occurs due to the influence of vibrations or the like of the mobile apparatus, and the accuracy of environment recognition is lowered. With a sensor having a high frame rate, the accuracy of environment recognition can be increased, but it is expensive.

The camera shake correction technology of Patent Literature 1 detects camera shake and adds optical correction such as cancel of the motion of the camera shake, so that noise is reduced in a passive manner. Patent Literature 2 estimates the amount of shake from a sensor image and removes generated noise. Patent Literature 3 generates prediction information including past, current, and future position data of a moving body when an object is chased and imaged with a fixed camera, and tracks the object on the basis of the prediction information.

The camera shake correction technology of Patent Literature 1 is a correction for the motion of a hand, and is not for absorbing the motion of an object to be recognized and limits the correction range of the optical correction or the like. Further, since a camera parameter changes, there is a possibility that the subsequent processing is affected.

In view of the circumstances as described above, it is an object of the present disclosure to more reliably reduce noise from a sensor of a mobile apparatus that moves in an automated manner in an environment, and to improve the accuracy of environment recognition.

Solution to Problem

A mobile apparatus according to one embodiment of the present disclosure includes:

a moving mechanism for moving in an automated manner in an environment;

a sensor that senses an object in the environment;

a sensor posture control mechanism that controls a posture of the sensor;

an environment observation unit that generates environment information on the basis of a sensing result of the sensor;

a moving mechanism control unit that generates, on the basis of the environment information, a moving mechanism control command value for controlling a motion of the moving mechanism and outputs the moving mechanism control command value to the moving mechanism to drive the moving mechanism;

a sensor posture estimation unit that estimates, on the basis of the environment information, the posture of the sensor when the moving mechanism moves in the environment to generate a sensor posture estimation value; and a sensor posture stabilization unit that generates, on the basis of the moving mechanism control command value, a sensor posture control command value for stabilizing the posture of the sensor to set a relative change of the sensor posture estimation value with respect to the environment information when the moving mechanism is driven on the basis of the moving mechanism control command value to be less than a threshold value, and outputs the sensor posture control command value to the sensor posture control mechanism to stabilize the posture of the sensor.

According to this embodiment, if the posture of the sensor is stabilized, it is possible to minimize the relative change of the sensor posture estimation value of the sensor with respect to the environment information when the moving mechanism is driven on the basis of the moving mechanism control command value. This makes it possible to reduce noise (blur or the like) when the sensor senses an object in the environment and to improve the accuracy of environment recognition (image recognition, self-position identification). The sensor posture control mechanism stabilizes the posture of the sensor on the basis of the sensor posture control command value generated on the basis of an internal moving mechanism control command value. Conversely, the posture of the sensor is not stabilized only on the basis of external environment information. The posture of the sensor is stabilized on the basis of the internal moving mechanism control command value, so that the posture of the sensor can be adjusted with high accuracy and high responsiveness as compared with the case where the posture of the sensor is stabilized only on the basis of the external environment information. Further, the moving mechanism control command value includes a series of sequences (target posture, target posture speed, target speed, target rotation speed of the moving mechanism, and the like) of an action plan including future time-series command values in addition to a real-time command value, and thus the sensor posture stabilization unit can perform feedforward control. Further, the fluctuation of the sensor, which is caused by the fluctuation that the mobile apparatus receives from an external factor (difference in level or the like), can be cancelled out.

The sensor posture estimation unit may estimate the posture of the sensor further on the basis of the moving mechanism control command value.

The sensor posture estimation unit estimates the posture of the sensor on the basis of the internal moving mechanism control command value that determines the posture of the moving mechanism after moving, and can thus generate the sensor posture estimation value more accurately.

The sensor posture stabilization unit may generate the sensor posture control command value further on the basis of the environment information.

The sensor posture estimation unit estimates the posture of the sensor on the basis of the external environment information, and can thus generate the sensor posture estimation value more accurately.

The environment observation unit may generate, as the environment information, a world coordinate system for a sensor coordinate system of the sensor, and/or position information of an object to be tracked existing in the environment.

According to this embodiment, if the posture of the sensor is stabilized, it is possible to minimize the relative change of the sensor posture estimation value (sensor coordinate system) of the sensor with respect to the environment information (world coordinate system) when the moving mechanism is driven on the basis of the moving mechanism control command value. This makes it possible to reduce noise (blur or the like) when the sensor senses an object in the environment and to improve the accuracy of environment recognition (image recognition, self-position identification). Even if the moving mechanism fluctuates up and down, the fluctuation of the posture of the sensor is minimum, so that the entire mobile apparatus can move naturally.

The mobile apparatus may further include a sensor operation control unit that temporarily stops sensing of the sensor or changes a sensing condition of the sensor if the sensor posture stabilization unit fails to generate the sensor posture control command value for setting the relative change to be less than the threshold value.

If the posture of the sensor is not stabilized (e.g., if wind is extremely strong, and if there are many obstacles on the ground) even when the posture of the sensor is controlled on the basis of the sensor posture control command value, there is a possibility that the output of the sensor contains a large amount of noise (noise is not completely absorbed), and thus the sensor operation control unit changes a sensing condition to control the sensor under the changed sensing condition.

It may be determined that the sensor posture control command value fails to be generated if it is determined that the relative change fails to be less than the threshold value on the basis of the environment information generated by the environment observation unit, if the sensor posture control command value generated by the sensor posture stabilization unit is not a value for setting the relative change to be less than the threshold value, or if a relative change of the posture of the sensor that is caused by the sensor posture control command value generated by the sensor posture stabilization unit is not less than the threshold value.

The sensor may include an observation sensor that senses the object necessary to generate the environment information, and an image sensor that senses an object to be tracked in the environment, the sensor posture control mechanism may include an image sensor posture control mechanism that controls a posture of the image sensor, the environment observation unit may generate the environment information on the basis of a sensing result of the observation sensor, the sensor posture estimation unit may estimate the posture of the image sensor when the mobile apparatus moves in the environment to generate a sensor posture estimation value of the image sensor, and the sensor posture stabilization unit may generate, on the basis of the moving mechanism control command value, an image sensor posture control command value that is a sensor posture control command value for stabilizing the posture of the image sensor to set a relative change of the sensor posture estimation value of the image sensor with respect to the environment information to be less than a threshold value, and output the image sensor posture control command value to the image sensor posture control mechanism to stabilize the posture of the image sensor.

In this embodiment, it is possible to reduce noise (blur or the like) when the image sensor senses (images) an object in the environment and to prevent the captured-image quality from deteriorating.

The sensor posture control mechanism may further include an observation sensor posture control mechanism that controls a posture of the observation sensor, the sensor posture estimation unit may further estimate the posture of the observation sensor when the mobile apparatus moves in the environment to generate a sensor posture estimation value of the observation sensor, and the sensor posture stabilization unit may further generate, on the basis of the moving mechanism control command value, an observation sensor posture control command value that is a sensor posture control command value for stabilizing the posture of the observation sensor to set a relative change of the sensor posture estimation value with respect to the environment information to be less than a threshold value, and output the observation sensor posture control command value to the observation sensor posture control mechanism to stabilize the posture of the observation sensor.

In this embodiment, it is possible to reduce noise (blur or the like) when the observation sensor senses an object in the environment and to improve the accuracy of environment recognition (image recognition, self-position identification).

The environment observation unit may generate, on the basis of the sensing result of the observation sensor, position information of an object to be tracked existing in the environment as the environment information, the mobile apparatus may further include an object-to-be-tracked motion prediction unit that predicts a motion of the object to be tracked on the basis of the position information of the object to be tracked and generates object-to-be-tracked motion prediction information, and the sensor posture stabilization unit may generate the image sensor posture control command value further on the basis of the object-to-be-tracked motion prediction information and output the image sensor posture control command value to the image sensor posture control mechanism.

According to this embodiment, the sensor posture stabilization unit predicts the motion of the center of gravity of a person who is an object to be tracked or the center point of the face of the person, and generates the image sensor posture control command value to minimize the change in the predicted point and the posture of the image sensor. In particular, minimizing a relative posture change in the posture of the sensor relative to the center point of the face of the person rather than the center of gravity of the person reduces the observation noise of the image sensor, and it is expected that the recognition accuracy of the face, the facial expression, and the like is improved. This makes it possible to achieve facial recognition, bone estimation, and facial expression recognition while tracking a person who is performing large physical motion such as running, and to achieve imaging with less shake or blur.

An information processing program according to one embodiment of the present disclosure causes a control circuit of a mobile apparatus, the mobile apparatus including a moving mechanism for moving in an automated manner in an environment, a sensor that senses an object in the environment, and a sensor posture control mechanism that controls a posture of the sensor, to operate as:

an environment observation unit that generates environment information on the basis of a sensing result of the sensor;

a moving mechanism control unit that generates, on the basis of the environment information, a moving mechanism control command value for controlling a motion of the moving mechanism and outputs the moving mechanism control command value to the moving mechanism to drive the moving mechanism;

a sensor posture estimation unit that estimates, on the basis of the environment information, the posture of the sensor when the moving mechanism moves in the environment to generate a sensor posture estimation value; and a sensor posture stabilization unit that generates, on the basis of the moving mechanism control command value, a sensor posture control command value for stabilizing the posture of the sensor to set a relative change of the sensor posture estimation value with respect to the environment information when the moving mechanism is driven on the basis of the moving mechanism control command value to be less than a threshold value, and outputs the sensor posture control command value to the sensor posture control mechanism to stabilize the posture of the sensor.

An information processing method according to one embodiment of the present disclosure is performed by a mobile apparatus including a moving mechanism for moving in an automated manner in an environment, a sensor that senses an object in the environment, and a sensor posture control mechanism that controls a posture of the sensor, the information processing method including:

generating environment information on the basis of a sensing result of the sensor;

generating, on the basis of the environment information, a moving mechanism control command value for controlling a motion of the moving mechanism and outputting the moving mechanism control command value to the moving mechanism to drive the moving mechanism;

estimating, on the basis of the environment information, the posture of the sensor when the moving mechanism moves in the environment to generate a sensor posture estimation value; and generating, on the basis of the moving mechanism control command value, a sensor posture control command value for stabilizing the posture of the sensor to set a relative change of the sensor posture estimation value with respect to the environment information when the moving mechanism is driven on the basis of the moving mechanism control command value to be less than a threshold value, and outputting the sensor posture control command value to the sensor posture control mechanism to stabilize the posture of the sensor.

MODE(S) FOR CARRYING OUT THE INVENTION

Hereinafter, embodiments of the present disclosure will be described with reference to the drawings.

I. First Embodiment

1. Hardware Configuration of Mobile Apparatus

Figure 1:
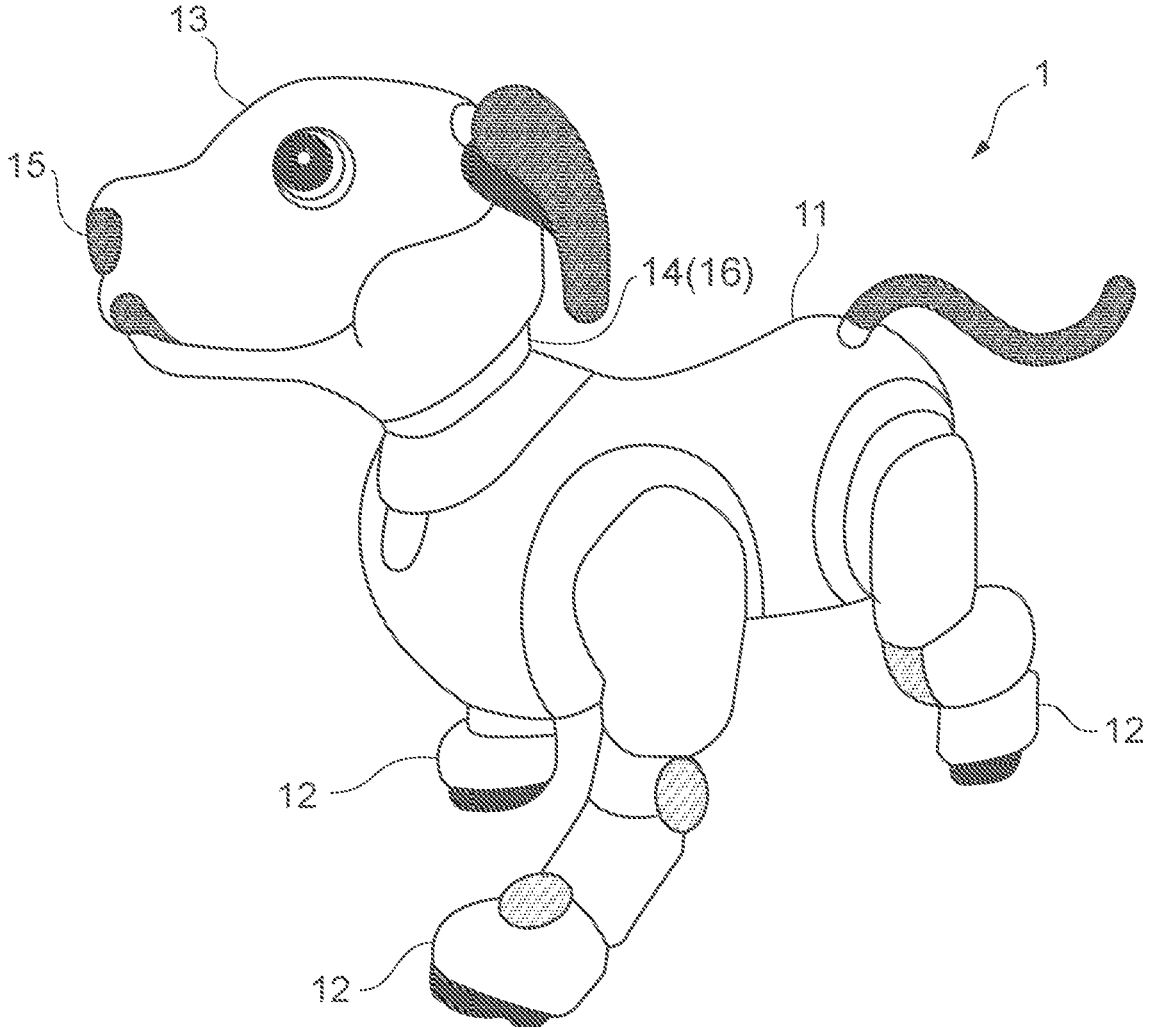
FIG. 1 shows a hardware configuration of a mobile apparatus according to a first embodiment of the present disclosure.

FIG. 1 shows a hardware configuration of a mobile apparatus according to a first embodiment of the present disclosure.

A mobile apparatus 1 is, for example, a pet-type (in this embodiment, dog-type) quadrupedal robot. The mobile apparatus 1 includes a main body 11, a moving mechanism 12, a head portion 13, a neck portion 14, a sensor 15, and a sensor posture control mechanism 16.

Figure 2:
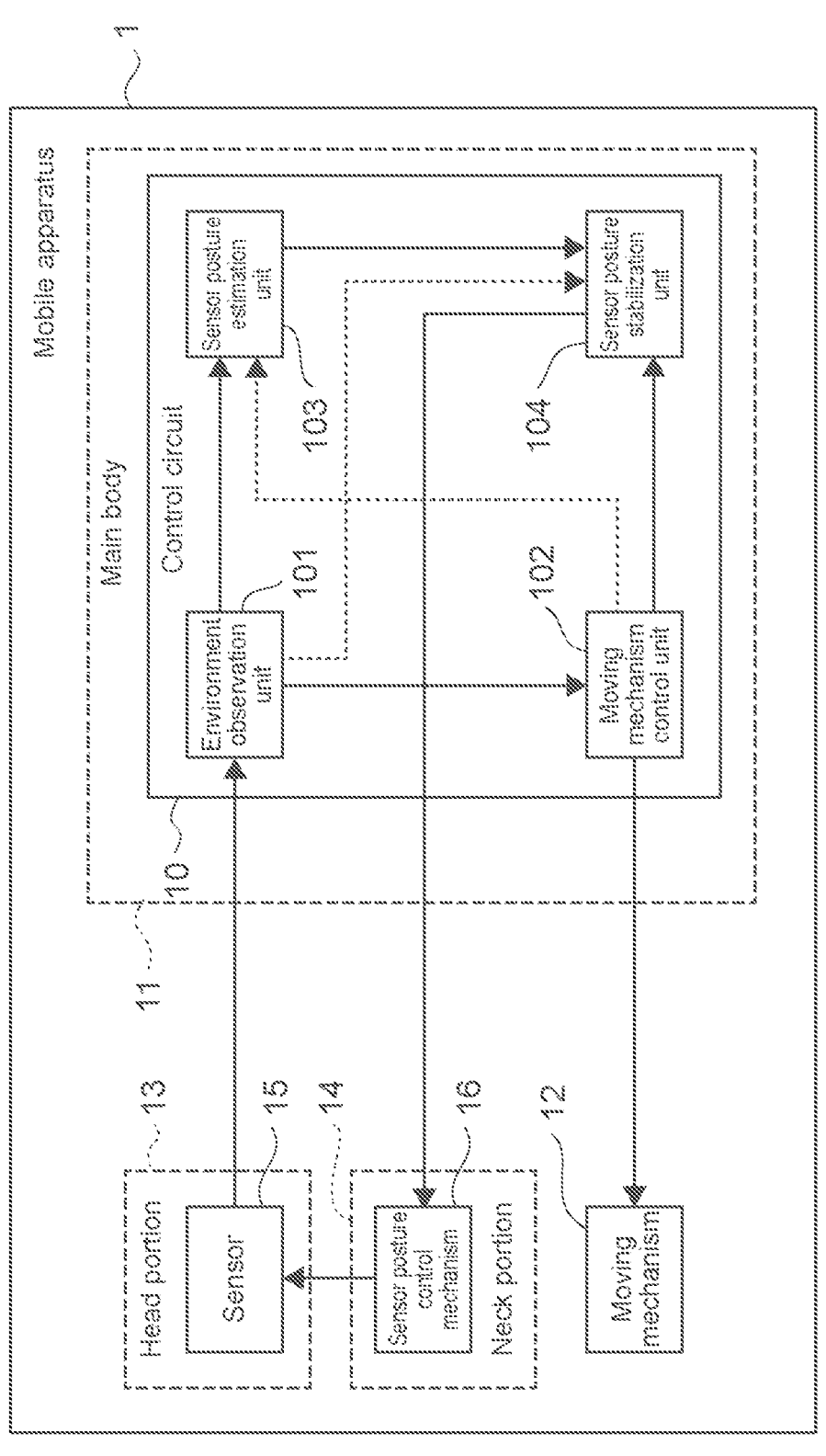
FIG. 2 shows a functional configuration of the mobile apparatus.

The main body 11 is a trunk of the mobile apparatus 1 that is a pet-type robot, and incorporates a control circuit 10 (FIG. 2). The moving mechanism 12 includes four legs of the mobile apparatus 1 that is a pet-type robot, and are independently and movably provided to the main body 11. The moving mechanism 12 is a mechanical mechanism incorporating an actuator or a gimbal that drives the moving mechanism 12 in order for the mobile apparatus 1 to quadrupedally move in an automated manner in an environment. The head portion 13 is a head portion of the mobile apparatus 1 that is a pet-type robot, and is independently and movably provided to the main body 11 via the neck portion 14.

The sensor 15 is provided to the head portion 13. The sensor 15 is an observation sensor that senses an object in the environment. The sensor 15 senses, for example, an object existing in the environment (person, furniture, or the like) as an object in the environment. The sensor 15 includes, for example, one or a plurality of sensors among an image sensor, a depth sensor, a position sensor (GPS), and a ranging sensor (e.g., time-of-flight (ToF) sensor). For example, the sensor 15 such as an image sensor or a ranging sensor is provided to the nose of the pet-type robot serving as the mobile apparatus 1. The sensor 15 may further include an inertial measurement unit (IMU), an encoder, and the like.

The sensor posture control mechanism 16 is a mechanical mechanism that is built in the neck portion 14 and incorporates an actuator or a gimbal for converting an electric signal output by the control circuit 10 into physical motion of the head portion 13. The sensor posture control mechanism 16 controls the posture of the sensor 15 provided to the head portion 13 by moving the head portion 13 relative to the main body 11 via the neck portion 14.

2. Functional Configuration of Mobile Apparatus

FIG. 2 shows a functional configuration of the mobile apparatus.

In the control circuit 10 of the mobile apparatus 1, a CPU loads an information processing program recorded on a ROM to a RAM and executes the information processing program, thus operating as an environment observation unit 101, a moving mechanism control unit 102, a sensor posture estimation unit 103, and a sensor posture stabilization unit 104.

3. Operation Flow of Mobile Apparatus

Figure 3:
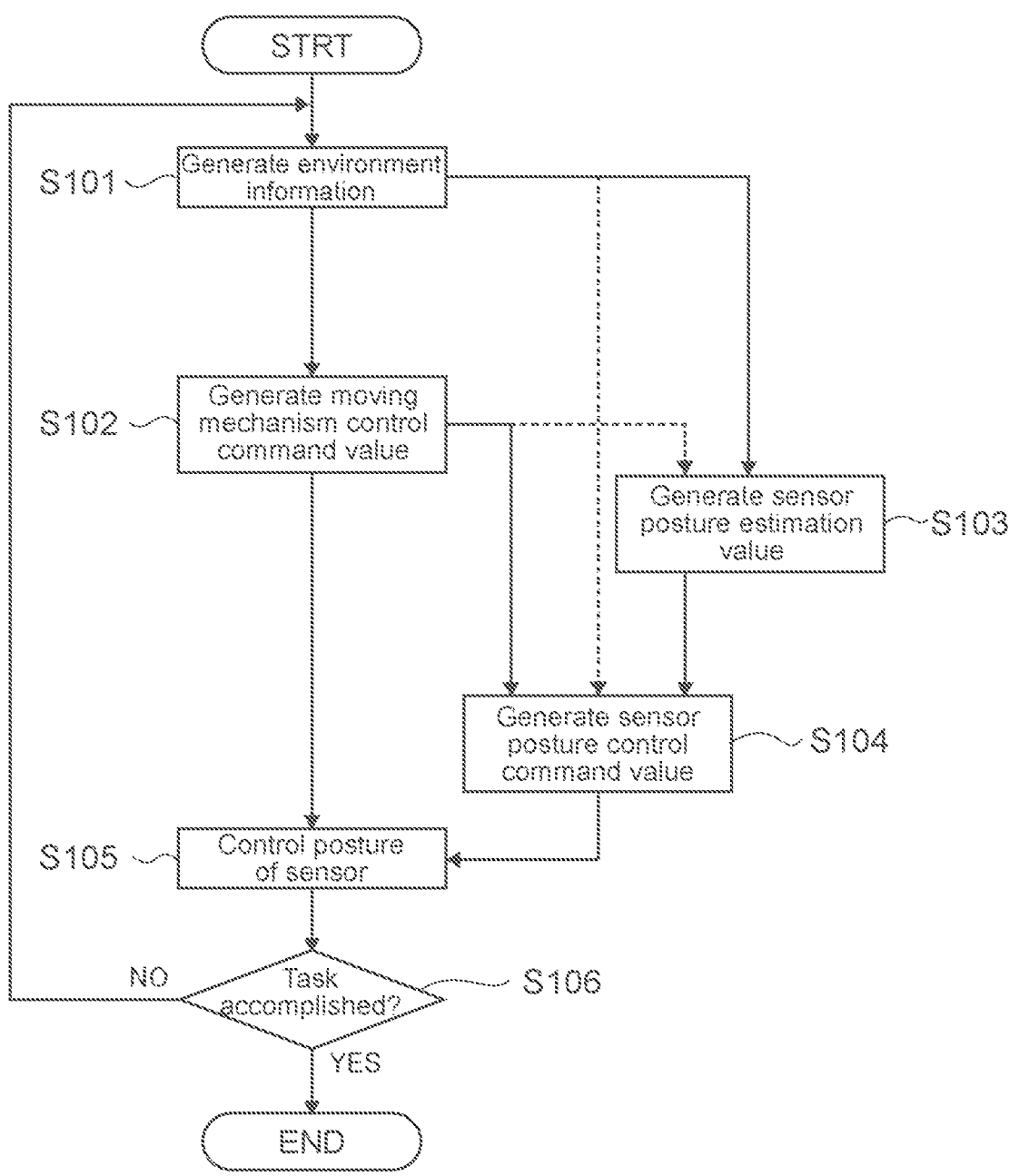
FIG. 3 shows an operation flow of the mobile apparatus.

FIG. 3 shows an operation flow of the mobile apparatus.

The sensor 15 continues to sense an object in the environment and continues to output a sensing result to the environment observation unit 101. The sensing result includes information such as image data obtained by imaging the environment with an image sensor and a distance to an object existing in the environment (person, furniture, or the like) measured by the ranging sensor.

The environment observation unit 101 acquires the sensing result (image data, distance information, and the like) from the sensor 15. The environment observation unit 101 generates environment information on the basis of the sensing result of the sensor 15 (Step S101). Specifically, the environment information is a world coordinate system for a sensor coordinate system of the sensor 15. The environment information may further include position information (coordinate information in the world coordinate system) of a object to be tracked (e.g., person) existing in the environment.

The moving mechanism control unit 102 generates a moving mechanism control command value for controlling the motion of the moving mechanism 12 on the basis of the environment information (world coordinate system) generated by the environment observation unit 101 (Step S102). The moving mechanism control command value is a series of sequences (target posture, target posture speed, target speed, target rotation speed of the moving mechanism, and the like) of an action plan including future time-series command values in addition to a real-time command value. The moving mechanism control unit 102 outputs the generated moving mechanism control command value to the moving mechanism 12 to drive the moving mechanism 12. Thus, the mobile apparatus 1 performs motion such as quadrupedal walking.

The sensor posture estimation unit 103 estimates the posture of the sensor 15 on the basis of the environment information (world coordinate system) generated by the environment observation unit 101 to generate a sensor posture estimation value (Step S103). The sensor posture estimation value is the sensor coordinate system of the sensor 15 for the world coordinate system. For example, when determining that there is a difference in level in the environment on the basis of the environment information, the sensor posture estimation unit 103 estimates a fluctuation of the posture of the sensor 15, in which the mobile apparatus 1 fluctuates up and down and consequently the sensor 15 fluctuates up and down. Note that the sensor posture estimation unit 103 may estimate the posture of the sensor 15 further on the basis of the output of the IMU or the encoder. The sensor posture estimation unit 103 may estimate the posture of the sensor 15 further on the basis of the moving mechanism control command value generated by the moving mechanism control unit 102. The sensor posture estimation unit 103 can generate the sensor posture estimation value more accurately by estimating the posture of the sensor 15 further on the basis of the internal moving mechanism control command value that determines the posture of the moving mechanism 12 after moving, in addition to the external environment information (world coordinate system).

The sensor posture stabilization unit 104 generates a sensor posture control command value on the basis of the moving mechanism control command value generated by the moving mechanism control unit 102 (Step S104). The sensor posture control command value is a value for stabilizing the posture of the sensor 15 in order to set a relative change of the sensor posture estimation value (sensor coordinate system) with respect to the environment information (world coordinate system) to be less than a threshold value (specifically, minimum) when the moving mechanism 12 is driven on the basis of the moving mechanism control command value. In other words, the motion of the moving mechanism 12 is determined on the basis of the moving mechanism control command value, with the result that the motion of the mobile apparatus 1 itself is determined. For example, if there is a difference in level in the environment, the moving mechanism control command value is a value for the moving mechanism 12 to fluctuate up and down in order to climb over the difference in level, and the mobile apparatus 1 itself also fluctuates up and down, with the result that the sensor 15 provided to the head portion 13 also fluctuates up and down. In this regard, the sensor posture stabilization unit 104 generates a sensor posture control command value for setting a relative change of the fluctuating sensor posture estimation value (sensor coordinate system) with respect to the fixed environment information (world coordinate system) to be less than a threshold value (specifically, minimum). Specifically, the sensor posture stabilization unit 104 generates a sensor posture control command value to minimize a fluctuation of the posture of the sensor 15 (i.e., posture of the head portion 13) even when the moving mechanism 12 fluctuates up and down. Note that the sensor posture stabilization unit 104 may generate the sensor posture control command value further on the basis of the environment information (world coordinate system) generated by the environment observation unit 101 and the output of the IMU or the encoder. The sensor posture stabilization unit 104 can generate the sensor posture control command value to minimize the fluctuation of the posture of the sensor 15 more accurately by generating the sensor posture control command value further on the basis of the external environment information (world coordinate system) in addition to the internal moving mechanism control command value that determines the sensor posture estimation value (sensor coordinate system) dependent on the posture of the moving mechanism 12 after moving. The sensor posture stabilization unit 104 outputs the generated sensor posture control command value to the sensor posture control mechanism 16 to stabilize the posture of the sensor 15.

Machine learning may be used when the sensor posture stabilization unit 104 generates a control command value. A system may be adopted, in which time-series information such as surrounding environment information and control information of a robot is used for input, and a control command value or intermediate information (prediction and estimation information) for generating a control command value is output. In machine learning, a function that minimizes the displacement of the output is learned for a time-series pattern of the input. At that time, a neural network or a method such as reinforcement learning may be used. When it is difficult to model the time series of input or disturbance, model prediction or approximation is performed by machine learning on the basis of data collected in advance or in a field, so that the effect of the present invention can be expected to be further exhibited.

The sensor posture control mechanism 16 acquires the sensor posture control command value generated by the sensor posture stabilization unit 104 on the basis of the moving mechanism control command value. The sensor posture control mechanism 16 is driven on the basis of the sensor posture control command value to stabilize the posture of the sensor 15 (Step S105). Thus, even if the moving mechanism 12 fluctuates up and down, the fluctuation of the posture of the sensor 15 (i.e., posture of the head portion 13) is minimized, and the posture of the sensor 15 is stabilized.

The control circuit 10 repeats the processing of Step S101 to Step 105 in a period of a few milliseconds to a few seconds until a task (e.g., arriving at a destination) is accomplished (Step S106).

4. Summary

If the mobile apparatus 1 is a pet-type (in this example, dog-type) quadrupedal robot, the motion of the four legs included in the moving mechanism 12 varies individually, and thus the posture of the sensor 15 is more likely to fluctuate, for example, as compared with a mobile apparatus (automated driving vehicle, AGV, or the like) including a wheel-type moving mechanism. In this regard, according to this embodiment, if the posture of the sensor 15 is stabilized, it is possible to minimize a relative change of the sensor posture estimation value (sensor coordinate system) of the sensor 15 with respect to the environment information (world coordinate system) when the moving mechanism 12 is driven on the basis of the moving mechanism control command value. This makes it possible to reduce noise (blur or the like) when the sensor 15 senses an object in the environment and to improve the accuracy of the environment recognition (image recognition, self-position identification). The sensor posture control mechanism 16 stabilizes the posture of the sensor 15 on the basis of the sensor posture control command value generated on the basis of the internal moving mechanism control command value. Conversely, the posture of the sensor 15 is not stabilized only on the basis of the external environment information. The posture of the sensor 15 is stabilized on the basis of the internal moving mechanism control command value, so that the posture of the sensor 15 can be adjusted with high accuracy and high responsiveness as compared with the case where the posture of the sensor 15 is stabilized only on the basis of the external environment information. Further, the moving mechanism control command value includes a series of sequences (target posture, target posture speed, target speed, target rotation speed of the moving mechanism, and the like) of an action plan including future time-series command values in addition to a real-time command value, and thus the sensor posture stabilization unit 104 can perform feedforward control. Further, the fluctuation of the sensor 15, which is caused by the fluctuation that the mobile apparatus 1 receives from an external factor (difference in level or the like), can be cancelled out.

If the mobile apparatus 1 is a pet-type (in this example, dog-type) quadrupedal robot, improving the accuracy of environment recognition (image recognition, self-position identification) makes it possible to increase the accuracy of human recognition, and thus possible to follow a person who is walking or to approach a person who is stopping. Further, even if the moving mechanism 12 fluctuates up and down, the fluctuation of the posture of the sensor 15 (i.e., posture of the head portion 13) is minimized, so that the head portion 13 smoothly moves without cogging, and the entire mobile apparatus 1 can move in a manner closer to an actual animal. Further, if a relative positional change between an object to be tracked and the sensor 15 is minimized, it is applicable to an operation such as moving the moving mechanism 12 to change the direction of the main body 11 (trunk) while the sensor 15 provided to the head portion 13 faces a person (object to be tracked).

5. Application Example

Figure 4:
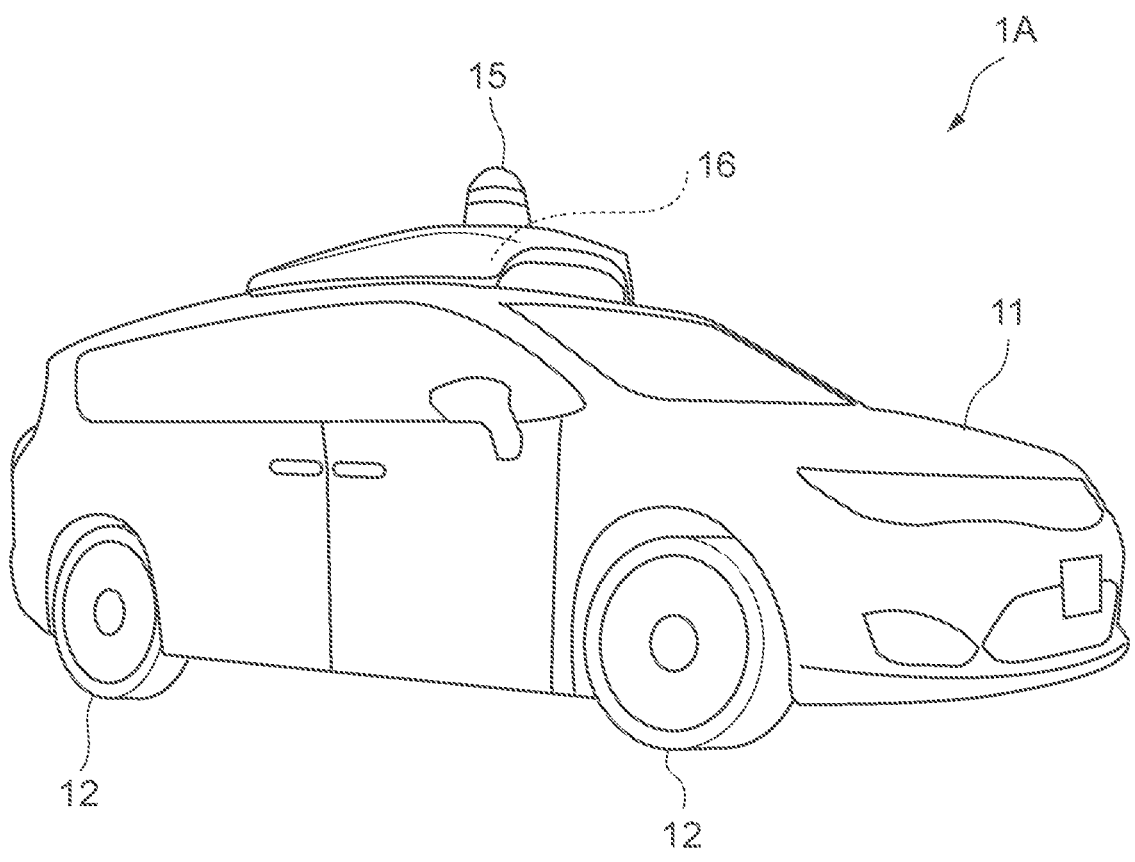
FIG. 4 shows a mobile apparatus according to another form.

FIG. 4 shows a mobile apparatus of another form.

In this embodiment, the mobile apparatus 1 has been described, for example, as a pet-type (in this example, dog-type) quadrupedal robot. On the other hand, the mobile apparatus 1 may be another mobile apparatus (e.g., automated driving vehicle, AGV, or drone). The case where a mobile apparatus 1A is an automated driving vehicle will be described as an example.

The mobile apparatus 1A includes a main body 11, a moving mechanism 12, a sensor 15, and a sensor posture control mechanism 16.

The main body 11 is the mobile apparatus 1 itself that is an automated driving vehicle, and incorporates a control circuit 10. The moving mechanism 12 includes four wheels of tires of the mobile apparatus 1A that is an automated driving vehicle, and is independently and movably provided to the main body 11. The moving mechanism 12 is a mechanical mechanism incorporating an actuator or a gimbal that drives the moving mechanism 12 in order for the mobile apparatus 1A to move in an automated manner in the environment.

The sensor 15 is provided to the main body 11. The sensor 15 is an observation sensor that senses an object in the environment. The sensor 15 senses, for example, an object existing in the environment (terrain, vanishing point, or the like) as an object in the environment. The sensor 15 includes, for example, one or a plurality of sensors among an image sensor, a depth sensor, a position sensor (GPS), and a ranging sensor (e.g., time-of-flight (ToF) sensor). For example, the sensor 15 such as an image sensor or a ranging sensor is provided to a position (in this example, roof) at which the front of the main body 11 can be sensed. The sensor 15 may further include an inertial measurement unit (IMU), an encoder, LiDAR (Light Detection And Ranging), and the like.

The sensor posture control mechanism 16 is a mechanical mechanism incorporating an actuator or a gimbal for converting an electric signal output by the control circuit 10 into physical motion of the sensor 15. The sensor posture control mechanism 16 controls the posture of the sensor 15 by moving the sensor 15 relative to the main body 11.

With reference to FIGS. 2 and 3, during automated running control of the mobile apparatus 1A that is an automated driving vehicle, an environment observation unit 101 acquires a sensing result (image data, distance information, and the like) from the sensor 15 and generates environment information on the basis of the sensing result (Step S101).

A moving mechanism control unit 102 generates a moving mechanism control command value for controlling the motion of the moving mechanism 12 on the basis of the environment information generated by the environment observation unit 101 (Step S102).

A sensor posture estimation unit 103 estimates the posture of the sensor 15 on the basis of the environment information to generate a sensor posture estimation value (Step S103). For example, the sensor posture estimation unit 103 estimates a change in the posture of the mobile apparatus 1A (the vehicle body largely moves when it climbs over a difference in level) due to disturbance (e.g., difference in level) on the basis of observation information of the IMU or the LiDAR. The sensor posture estimation unit 103 may further estimate the posture of the sensor 15 further on the basis of the moving mechanism control command value generated by the moving mechanism control unit 102.

A sensor posture stabilization unit 104 generates a sensor posture control command value to minimize the posture of the sensor on the basis of the moving mechanism control command value (including a traveling plan) (Step S104). The sensor posture stabilization unit 104 may generate the sensor posture control command value further on the basis of the environment information generated by the environment observation unit 101 and the output of the IMU, the LiDAR, or the encoder. The sensor posture stabilization unit 104 outputs the generated sensor posture control command value to the sensor posture control mechanism 16 to stabilize the posture of the sensor 15.

If the mobile apparatus 1A is an automated driving vehicle, the change in the posture of the sensor 15 resulting from the disturbance (difference in level or the like) is also absorbed in addition to the motion caused by the change in posture of the mobile apparatus 1A itself, so that the observation noise of the sensor 15 is reduced. Thus, the accuracy of self-position estimation and the accuracy of image recognition are expected to be improved, and the automated driving technology is improved.

II. Second Embodiment

Hereinafter, the same configuration and operation as those of the embodiment described above will be denoted by the same reference symbols to omit description thereof, and different points will be mainly described.

In the first embodiment, the mobile apparatuses 1 and 1A each include the sensor 15 that can control the posture, the sensor 15 being an observation sensor that senses an object in an environment. Meanwhile, in the second embodiment, a mobile apparatus 2 includes an observation sensor that cannot control the posture but senses an object in an environment, and an image sensor that can control the posture and senses (images) an object to be tracked in the environment.

1. Hardware Configuration of Mobile Apparatus

Figure 5:
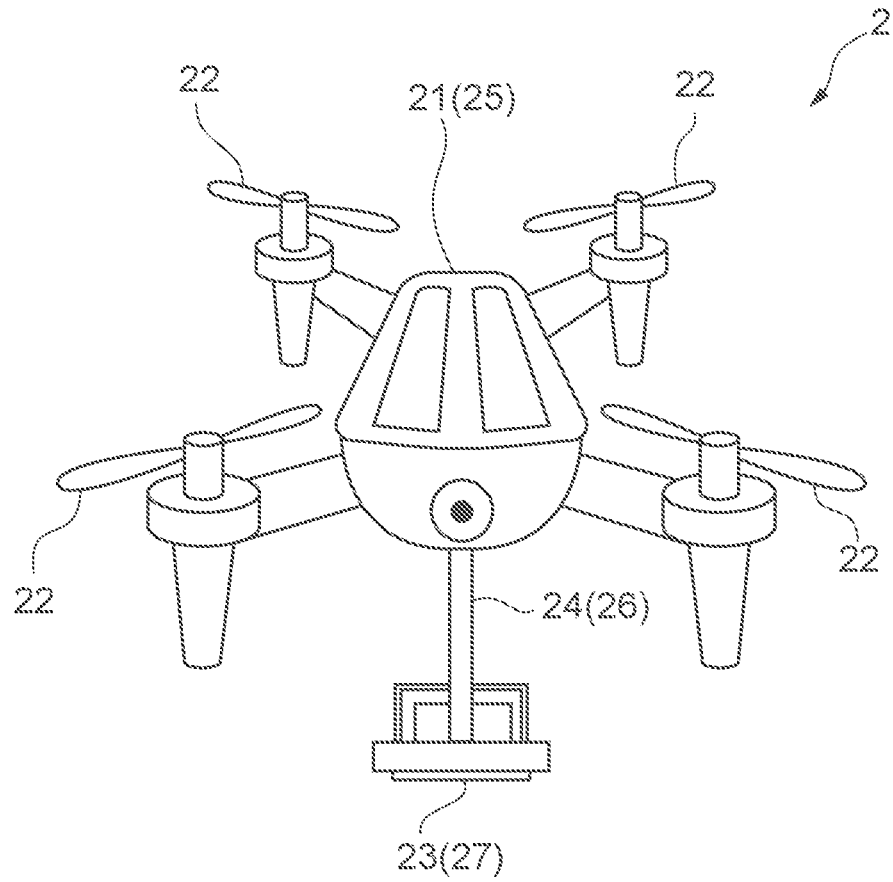
FIG. 5 shows a hardware configuration of a mobile apparatus according to a second embodiment of the present disclosure.

FIG. 5 shows a hardware configuration of a mobile apparatus according to the second embodiment of the present disclosure.

The mobile apparatus 2 is, for example, a drone for imaging. The mobile apparatus 2 includes a main body 21, a moving mechanism 22, a head 23, an arm 24, an observation sensor 25 (FIG. 6), an image sensor 27 (FIG. 6), and an image sensor posture control mechanism 26.

The main body 21 is the body of the mobile apparatus 2 that is a drone for imaging, and incorporates a control circuit 20. The moving mechanism 22 includes, for example, four propellers provided at intervals of 90 degrees in four directions, and is independently and movably provided to the main body 21. The moving mechanism 22 is a mechanical mechanism incorporating an actuator or a gimbal that drives the moving mechanism 22 in order for the mobile apparatus 2 to move in an automated manner in an environment while flying by propellers. The head 23 is independently and movably provided to the main body 21 via the arm 24.

The observation sensor 25 is provided to the main body 21. The observation sensor 25 senses an object in the environment. The observation sensor 25 senses, for example, an object (terrain, vanishing point, or the like) existing in the environment as an object in the environment. The observation sensor 25 includes, for example, two or a plurality of sensors among a wind sensor, an image sensor, a depth sensor, a position sensor (GPS), and a ranging sensor (e.g., time-of-flight (ToF) sensor). The wind sensor may be a system that utilizes the Doppler effect or may be a system that observes physical wind resistance. The observation sensor 25 may further include an inertial measurement unit (IMU), an encoder, and the like. The observation sensor 25 fails to independently change the posture relative to the main body 21.

The image sensor 27 is provided to the head 23. The image sensor 27 is an RGB image sensor that senses (images) an imaging object (person, terrain, fixed point of an infrastructure, or the like) that is an object to be tracked in the environment.

The image sensor posture control mechanism 26 is a mechanical mechanism that is built in the arm 24 and incorporates an actuator or a gimbal for converting an electric signal output by the control circuit 20 into physical motion of the head 23. The image sensor posture control mechanism 26 can rotate in three-axis directions. The image sensor posture control mechanism 26 controls the posture of the image sensor 27 provided to the head 23 in the three-axis (roll, pitch, yaw) directions by moving the head 23 relative to the main body 21 via the arm 24.

Figure 6:
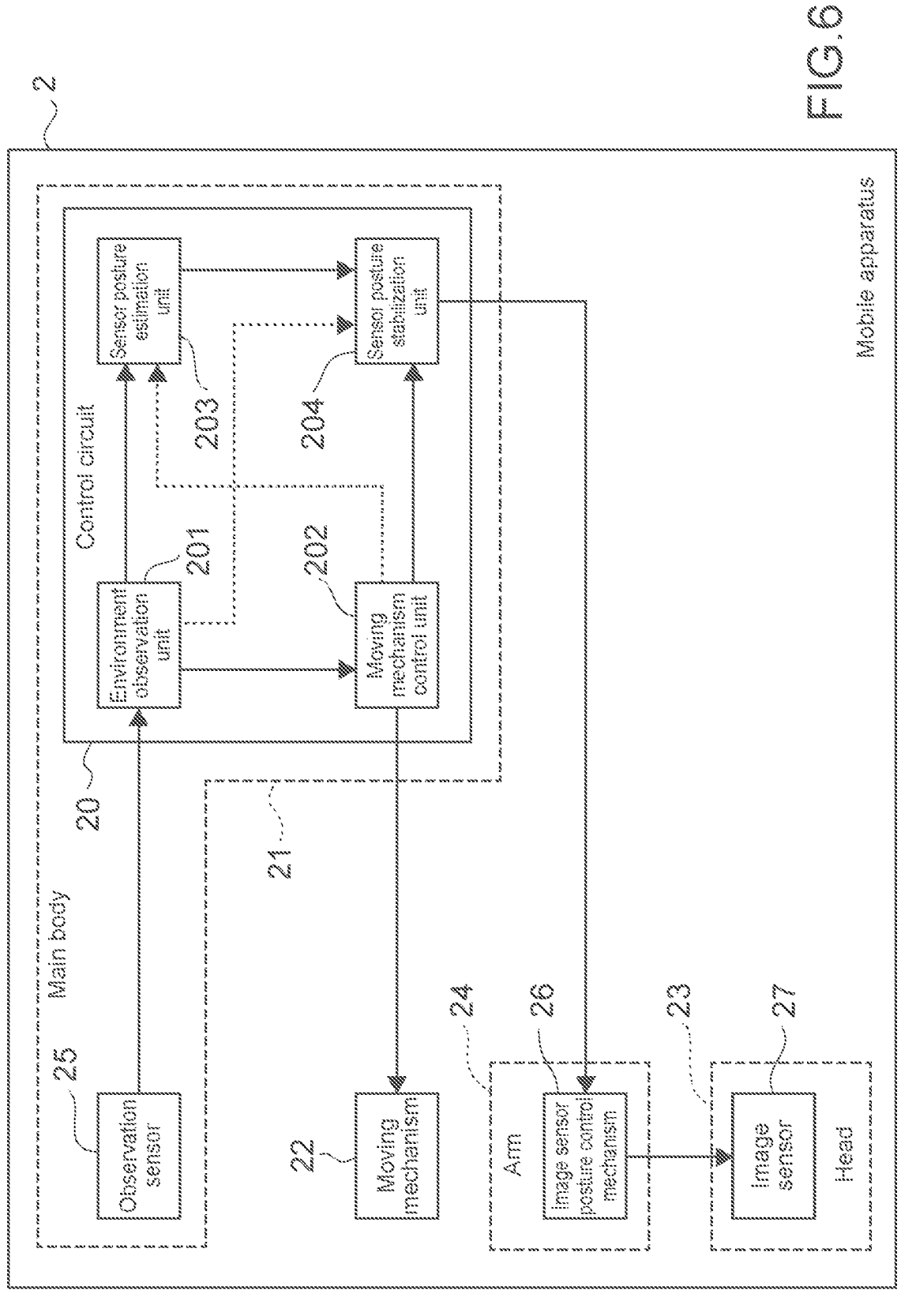
FIG. 6 shows a functional configuration of the mobile apparatus.

FIG. 6 shows a functional configuration of the mobile apparatus.

In the control circuit 20 of the mobile apparatus 2, the CPU loads an information processing program recorded on the ROM to the RAM and executes the information processing program, thus operating as an environment observation unit 201, a moving mechanism control unit 202, a sensor posture estimation unit 203, and a sensor posture stabilization unit 204.

3. Operation Flow of Mobile Apparatus

With reference to FIG. 3, the observation sensor 25 continues to sense an object in the environment and continues to output a sensing result to the environment observation unit 201. The sensing result includes information such as image data obtained by imaging the environment with an image sensor, and a distance to an object existing in the environment (terrain, vanishing point or the like) measured by the ranging sensor.

The environment observation unit 201 acquires the sensing result (image data, distance information, and the like) from the observation sensor 25. The environment observation unit 201 generates environment information on the basis of the sensing result of the observation sensor 25 (Step S101). Specifically, the environment information is a world coordinate system for the sensor coordinate system of the observation sensor 25. The environment information may further include position information (coordinate information in the world coordinate system) of an object to be tracked (e.g., a person) existing in the environment.

The moving mechanism control unit 202 generates a moving mechanism control command value for controlling the motion of the moving mechanism 22 on the basis of the environment information (world coordinate system) generated by the environment observation unit 201 (Step S102). The moving mechanism control command value is a series of sequences (target posture, target posture speed, target speed, target rotation speed of the moving mechanism, and the like) of an action plan including future time-series commands value in addition to a real-time command value. The moving mechanism control unit 202 outputs the generated moving mechanism control command value to the moving mechanism 22 to drive the moving mechanism 22. Thus, the mobile apparatus 2 flies in a predetermined direction.

The sensor posture estimation unit 203 estimates the posture of the image sensor 27 on the basis of the environment information (world coordinate system, information of wind sensor) to generate a sensor posture estimation value (Step S103). The sensor posture estimation value is the sensor coordinate system of the image sensor 27 for the world coordinate system. For example, when determining that there is a wind in the environment on the basis of the environment information, the sensor posture estimation unit 203 estimates a fluctuation of the posture of the image sensor 27, in which the mobile apparatus 2 fluctuates and consequently the image sensor 27 fluctuates. Note that the sensor posture estimation unit 203 may estimate the posture of the image sensor 27 further on the basis of the output of the IMU or the encoder. The sensor posture estimation unit 203 may estimate the posture of the image sensor 27 further on the basis of the moving mechanism control command value generated by the moving mechanism control unit 202. The sensor posture estimation unit 203 can generate the sensor posture estimation value more accurately by estimating the posture of the image sensor 27 further on the basis of the internal moving mechanism control command value that determines the posture of the moving mechanism 22 after moving, in addition to the external environment information (world coordinate system).

The sensor posture stabilization unit 204 generates an image sensor posture control command value on the basis of the moving mechanism control command value generated by the moving mechanism control unit 202 (Step S104). The image sensor posture control command value is a value for stabilizing the posture of the image sensor 27 in order to set a relative change of the sensor posture estimation value (sensor coordinate system) with respect to the environment information (world coordinate system) to be less than a threshold value (specifically, minimum) when the moving mechanism 22 is driven on the basis of the moving mechanism control command value. In other words, the motion of the moving mechanism 22 is determined on the basis of the moving mechanism control command value, with the result that the motion of the mobile apparatus 2 itself is determined. The sensor posture stabilization unit 204 generates an image sensor posture control command value for setting a relative change of the fluctuating sensor posture estimation value (sensor coordinate system) with respect to the fixed environment information (world coordinate system) to be less than a threshold value (specifically, minimum). Specifically, the sensor posture stabilization unit 204 generates an image sensor posture control command value to minimize a fluctuation of the posture of the image sensor 27 (i.e., posture of the head 23) even when the moving mechanism 22 fluctuates. Note that the sensor posture stabilization unit 204 may generate the image sensor posture control command value further on the basis of the environment information (world coordinate system) generated by the environment observation unit 201 and the output of the IMU or the encoder. The sensor posture stabilization unit 204 can generate the image sensor posture control command value to minimize the fluctuation of the posture of the image sensor 27 more accurately by generating the image sensor posture control command value further on the basis of the external environment information (world coordinate system) in addition to the internal moving mechanism control command value that determines the sensor posture estimation value (sensor coordinate system) dependent on the posture of the moving mechanism 22 after moving. The sensor posture stabilization unit 204 outputs the generated image sensor posture control command value to the image sensor posture control mechanism 26 to stabilize the posture of the image sensor 27.

The image sensor posture control mechanism 26 acquires the image sensor posture control command value generated by the sensor posture stabilization unit 204 on the basis of the moving mechanism control command value. The image sensor posture control mechanism 26 is driven on the basis of the image sensor posture control command value to stabilize the posture of the image sensor 27 (Step S105). Thus, even if the moving mechanism 22 fluctuates, the fluctuation of the posture of the image sensor 27 (that is, posture of the head 23) is minimized, and thus the posture of the image sensor 27 is stabilized.

The control circuit 20 repeats the processing of Step S102 to Step S105 in a period of a few milliseconds to a few seconds until a task (e.g., finishing imaging of a target subject) is accomplished (Step S106).

4. Specific Examples

Figure 7C:
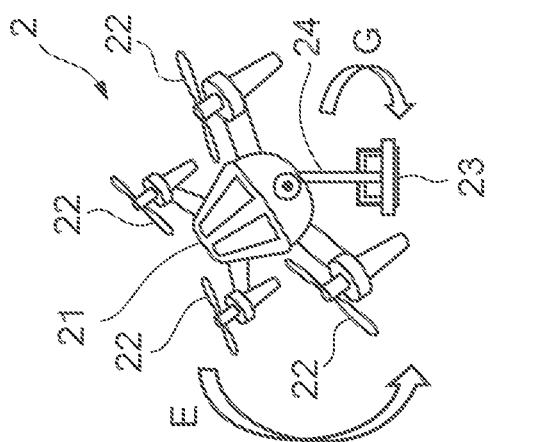
FIGS. 7A, 7B, and 7C show specific examples of stabilizing the posture of a sensor.
Figure 7B:
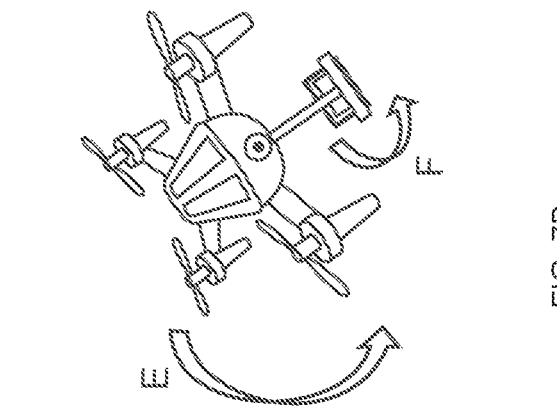
Figure 7A:
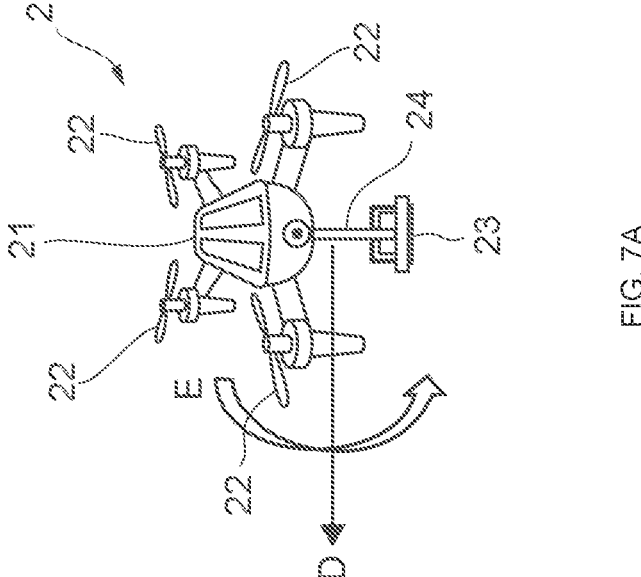

FIGS. 7A, 7B, and 7C show specific examples of stabilizing the posture of the sensor.

As shown in FIG. 7A, the mobile apparatus 1 is flying in a horizontal direction D. The moving mechanism control unit 202 wirelessly receives, for example, an instruction to fly in a right-front direction from a mobile device (not shown) carried by a user located on the ground. First, the moving mechanism control unit 202 generates a moving mechanism control command value for reducing the rotation speed of the right-front propeller included in the moving mechanism 22, and outputs the generated moving mechanism control command value to the moving mechanism 22, thus performing posture control E for lowering the main body 21 in the right-front direction (Step S102).

As shown in a comparative example FIG. 7B, when the mobile apparatus 2 changes the flying direction, the posture E of the main body 21 changes, and simultaneously the posture F of the image sensor 27 provided to the head 23 also changes, so that the imaging target region of the image sensor 27 also changes.

Meanwhile, in this embodiment, the sensor posture stabilization unit 204 generates an image sensor posture control command value on the basis of the moving mechanism control command value (Step S104). Specifically, the sensor posture stabilization unit 204 generates an image sensor posture control command value to minimize the fluctuation of the posture of the image sensor 27 (i.e., posture of the head 23) (in a manner that the posture FIG. 7A is not changed) even when the moving mechanism 22 fluctuates and consequently the posture of the main body 21 fluctuates from FIG. 7A to the comparative example FIG. 7B. As show in FIG. 7C, during the posture control E of lowering the main body 21 in the right-front direction, the sensor posture stabilization unit 204 outputs the generated image sensor posture control command value G to the image sensor posture control mechanism 26 to stabilize the posture of the image sensor 27 as shown in FIG. 7A.

With the main body 21 of the mobile apparatus 2 being tilted in the right-front direction, the moving mechanism control unit 202 generates a moving mechanism control command value for increasing the thrust of all the propellers included in the moving mechanism 22 and outputs the generated moving mechanism control command value to the moving mechanism 22, thus achieving motion to move the main body 21 in the right-front direction (Step S102).

5. Summary

The image sensor 27 that is the RGB image sensor causes blur, shake, an inclination of the image, a problem of rolling shutter, and the like due to translational and rotational motion associated with the movement of the mobile apparatus 2 as compared with the case where the image sensor 27 remains still, and the captured-image quality deteriorates. Meanwhile, according to this embodiment, the posture of the image sensor 27 is stabilized, so that it is possible to minimize a relative change of the sensor posture estimation value (sensor coordinate system) of the image sensor 27 with respect to the environment information (world coordinate system) when the moving mechanism 22 is driven on the basis of the moving mechanism control command value. This makes it possible to reduce noise (blur or the like) when the image sensor 27 senses (images) an object in the environment and to prevent the captured-image quality from deteriorating. Further, it is possible to cancel out the fluctuation of the image sensor 27 due to the fluctuation received by the mobile apparatus 2 from an external factor (wind or the like).

When the mobile apparatus 2, which is a drone, performs imaging (aerial imaging) while moving (flying), the motion of the main body 21 in the translational direction may fail to be completely cancelled out by the arm 24. In this regard, the sensor posture stabilization unit 204 generates a moving mechanism control command value for canceling out the rotation components of roll, pitch, and yaw of the mobile apparatus 2, with particular attention paid to the change in the posture of the mobile apparatus 2. The image sensor posture control mechanism 26 built in the arm 24 constituting a sensor posture control unit can rotate in three-axis directions. The image sensor posture control mechanism 26 holds an acceleration more than estimated from the change in the posture of the mobile apparatus 2 and a torque that can achieve the acceleration with respect to the image sensor 27. The sensor posture stabilization unit 204 can be expected to exhibit an effect of reducing shake only by cancelling out the rotation components in the imaging by the image sensor 27. In a use case such as a fixed point observation in an infrastructure inspection, a scene in which the position of the mobile apparatus 2 is not significantly changed may be considered. In this case, it is conceivable that the arm 24 minimizes the change in translational components x, y, and z as well as roll, pitch, and yaw. In such a case, a hardware configuration that absorbs the translational components more effectively, such as increasing the length of the arm 24 of the mobile apparatus 2, may be employed.

III. Third Embodiment

In the second embodiment, the mobile apparatus 2 includes the observation sensor 25 that cannot control the posture but senses an object in the environment, and the image sensor 27 that can control the posture and senses (images) an object to be tracked in the environment. Meanwhile, in the third embodiment, the postures of the observation sensor and the image sensor can be controlled.

1. Functional Configuration of Mobile Apparatus

Figure 8:
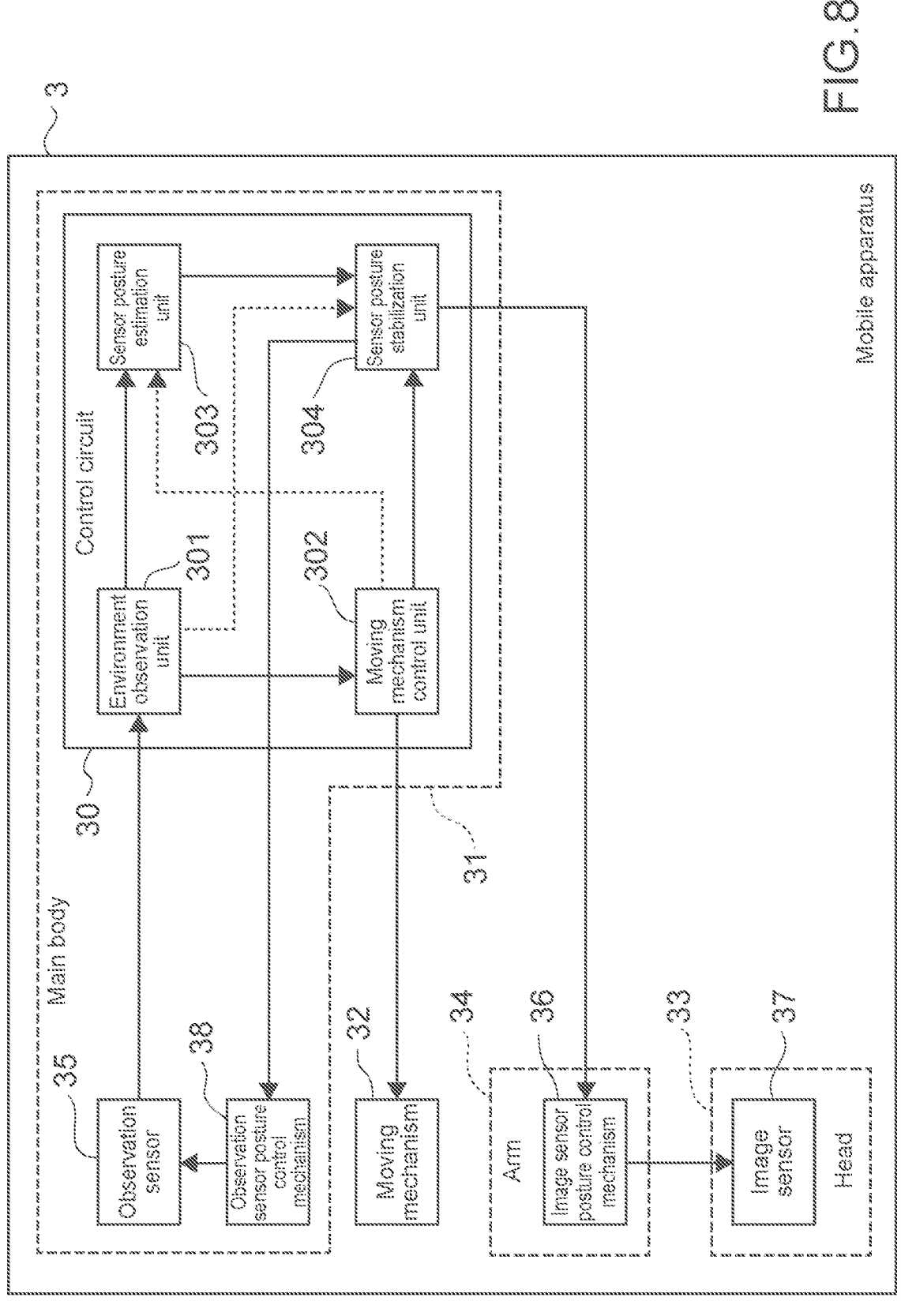
FIG. 8 shows a functional configuration of a mobile apparatus according to a third embodiment of the present disclosure.

FIG. 8 shows a functional configuration of a mobile apparatus according to a third embodiment of the present disclosure.

A mobile apparatus 3 is, for example, a drone for imaging. The mobile apparatus 3 further includes an observation sensor posture control mechanism 38 in addition to the configuration of the mobile apparatus 2 of the second embodiment.

The observation sensor posture control mechanism 38 is a mechanical mechanism that is provided to a main body 31 and incorporates an actuator or a gimbal for converting an electric signal output by a control circuit 30 into physical motion of the observation sensor 35.

The image sensor posture control mechanism 36 is a mechanical mechanism that is built in an arm 34 and incorporates an actuator or a gimbal for converting an electric signal output by the control circuit 30 into physical motion of a head 33. The image sensor posture control mechanism 36 can rotate in three-axis directions. The image sensor posture control mechanism 36 controls the posture of an image sensor 37 provided to the head 33 in the three-axis (roll, pitch, yaw) directions by moving the head 33 relative to the main body 31 via the arm 34.

In the control circuit 30 of the mobile apparatus 3, the CPU loads an information processing program recorded on the ROM to the RAM and executes the information processing program, thus operating as an environment observation unit 301, a moving mechanism control unit 302, a sensor posture estimation unit 303, and a sensor posture stabilization unit 304.

2. Operation Flow of Mobile Apparatus

The operation in Step S101 and Step S102 is similar to that of the second embodiment.

With reference to FIG. 3, the sensor posture estimation unit 303 estimates the postures of the observation sensor 35 and the image sensor 37 on the basis of the environment information (world coordinate system, information of wind sensor) to generate a sensor posture estimation value (Step S103). The sensor posture estimation value is a sensor coordinate system of each of the observation sensor 35 and the image sensor 37 for the world coordinate system. For example, when determining that there is a wind in the environment on the basis of the environment information, the sensor posture estimation unit 303 estimates the fluctuation of the postures of the observation sensor 35 and the image sensor 37, in which the mobile apparatus 3 fluctuates and consequently the observation sensor 35 and the image sensor 37 fluctuate. Note that the sensor posture estimation unit 303 may estimate the postures of the observation sensor 35 and the image sensor 37 further on the basis of the output of an IMU or an encoder. The sensor posture estimation unit 303 may estimate the postures of the observation sensor 35 and the image sensor 37 further on the basis of the moving mechanism control command value generated by the moving mechanism control unit 302. The sensor posture estimation unit 303 can generate the sensor posture estimation value more accurately by estimating the postures of the observation sensor 35 and the image sensor 37 further on the basis of the internal moving mechanism control command value that determines the posture of the moving mechanism 32 after moving, in addition to the external environment information (world coordinate system).

The sensor posture stabilization unit 304 generates an observation sensor posture control command value and an image sensor posture control command value on the basis of the moving mechanism control command value (Step S104). The observation sensor posture control command value and the image sensor posture control command value are values for stabilizing the postures of the observation sensor 35 and the image sensor 37 in order to set a relative change of the sensor posture estimation value (sensor coordinate system) with respect to the environment information (world coordinate system) to be less than a threshold value (specifically, minimum) when the moving mechanism 32 is driven on the basis of the moving mechanism control command value. In other words, the motion of the moving mechanism 32 is determined on the basis of the moving mechanism control command value, with the result that the motion of the mobile apparatus 3 itself is determined. The sensor posture stabilization unit 304 generates an observation sensor posture control command value and an image sensor posture control command value for setting a relative change of the fluctuating sensor posture estimation value (sensor coordinate system) with respect to the fixed environment information (world coordinate system) to be less than a threshold value (specifically, minimum). Specifically, the sensor posture stabilization unit 304 generates an observation sensor posture control command value and an image sensor posture control command value to minimize the fluctuation of the posture of the observation sensor 35 and the posture of the image sensor 37 (i.e., posture of the head 33) even when the moving mechanism 32 fluctuates. Note that the sensor posture stabilization unit 304 may generate the observation sensor posture control command value and the image sensor posture control command value further on the basis of the environment information (world coordinate system) generated by the environment observation unit 301 and the output of the IMU or the encoder. The sensor posture stabilization unit 304 can generate the observation sensor posture control command value and the image sensor posture control command value to minimize the fluctuation of the postures of the observation sensor 35 and the image sensor 37 more accurately by generating the observation sensor posture control command value and the image sensor posture control command value further on the basis of the external environment information (world coordinate system) in addition to the internal moving mechanism control command value that determines the sensor posture estimation value (sensor coordinate system) dependent on the posture of the moving mechanism 32 after moving. The sensor posture stabilization unit 304 outputs the generated observation sensor posture control command value to the observation sensor posture control mechanism 38 to stabilize the posture of the observation sensor 35. The sensor posture stabilization unit 304 outputs the generated image sensor posture control command value to the image sensor posture control mechanism 36 to stabilize the posture of the image sensor 37.

The observation sensor posture control mechanism 38 acquires the observation sensor posture control command value generated by the sensor posture stabilization unit 304 on the basis of the moving mechanism control command value. The observation sensor posture control mechanism 38 is driven on the basis of the observation sensor posture control command value to stabilize the posture of the observation sensor 35 (Step S105). Thus, even if the moving mechanism 32 fluctuates, the fluctuation of the posture of the observation sensor 35 is minimized, and thus the posture of the observation sensor 35 is stabilized.

The image sensor posture control mechanism 36 acquires the image sensor posture control command value generated by the sensor posture stabilization unit 304 on the basis of the moving mechanism control command value. The image sensor posture control mechanism 36 is driven on the basis of the image sensor posture control command value to stabilize the posture of the image sensor 37 (Step S105). Thus, even if the moving mechanism 32 fluctuates, the fluctuation of the posture of the image sensor 37 (that is, posture of the head 33) is minimized, and thus the posture of the image sensor 37 is stabilized.

3. Summary

In this embodiment, the postures of the observation sensor 35 and the image sensor 37 can be controlled. This makes it possible to reduce noise (blur or the like) when the observation sensor 35 senses (images) an object in the environment and to improve the accuracy of environment recognition (image recognition, self-position identification).

Simultaneously, it is possible to reduce noise (blur or the like) when the image sensor 37 senses (images) an object in the environment and to prevent the captured-image quality from deteriorating.

IV. Fourth Embodiment

1. Functional Configuration of Mobile Apparatus

Figure 9:
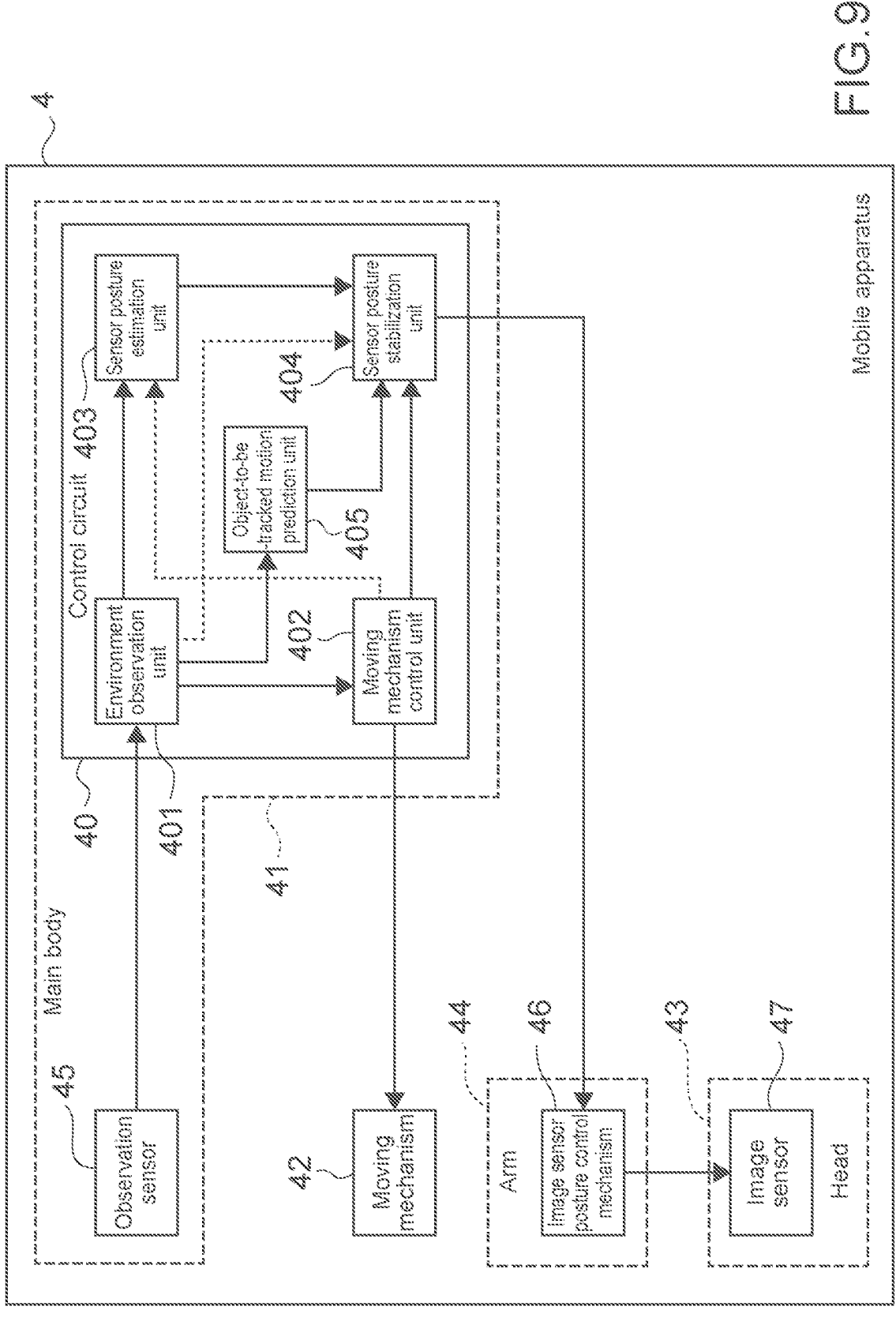
FIG. 9 shows a functional configuration of a mobile apparatus according to a fourth embodiment of the present disclosure.

FIG. 9 shows a functional configuration of a mobile apparatus according to a fourth embodiment of the present disclosure.

The hardware configuration of a mobile apparatus 4 according to the fourth embodiment is similar to the hardware configuration of the mobile apparatus 2 according to the second embodiment.

In a control circuit 40 of the mobile apparatus 4, the CPU loads an information processing program recorded on the ROM to the RAM and executes the information processing program, thus operating as an environment observation unit 401, a moving mechanism control unit 402, a sensor posture estimation unit 403, a sensor posture stabilization unit 404, and an object-to-be-tracked motion prediction unit 405.

2. Operation Flow of Mobile Apparatus

Figure 10:
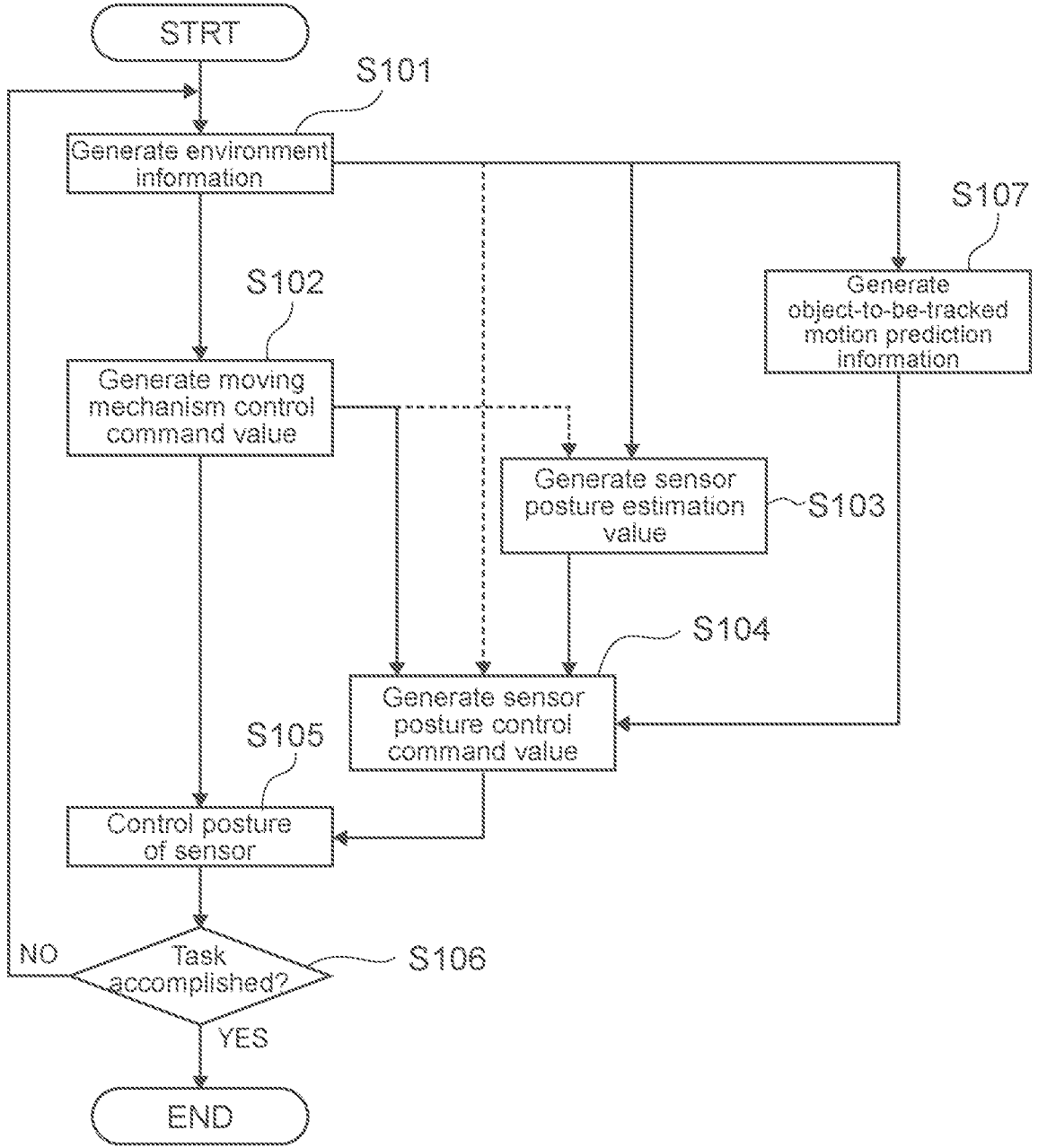
FIG. 10 shows an operation flow of the mobile apparatus.

FIG. 10 is an operation flow of the mobile apparatus.

The environment observation unit 201 acquires a sensing result (image data, distance information, and the like) from an observation sensor 25. The environment observation unit 201 generates environment information on the basis of the sensing result of the observation sensor 25 (Step S101). Specifically, the environment information is a world coordinate system for the sensor coordinate system of the observation sensor 25. The environment information further includes position information (coordinate information in the world coordinate system) of an object to be tracked (e.g., a person) existing in the environment. Specifically, the position information of an object to be tracked (e.g., a person) is coordinate information of the center of gravity of the person or the center point of the face of the person. The person as an object to be tracked may be, for example, a person who is performing large physical motion such as running.

The operation in Step S102 and Step S103 is similar to that of the second embodiment.

The object-to-be-tracked motion prediction unit 405 predicts the motion of the object to be tracked on the basis of the position information of the object to be tracked, and generates object-to-be-tracked motion prediction information (Step S107). For example, the object-to-be-tracked motion prediction unit 405 predicts the motion of the center of gravity of a person who is an object to be tracked or the center point of the face of the person, and generates the object-to-be-tracked motion prediction information.

The sensor posture stabilization unit 404 generates an image sensor posture control command value further on the basis of the object-to-be-tracked motion prediction information generated by the object-to-be-tracked motion prediction unit 405 in addition to the moving mechanism control command value and the external environment information (Step S104). The image sensor posture control command value is a value for stabilizing the posture of an image sensor 47 in order to set a relative change of the sensor posture estimation value (sensor coordinate system) with respect to the environment information (the center of gravity of the person or the center point of the face of the person in the world coordinate system) to be less than a threshold value (specifically, minimum) when the moving mechanism 44 is driven on the basis of the moving mechanism control command value. The sensor posture stabilization unit 404 generates an image sensor posture control command value for setting a relative change of the fluctuating sensor posture estimation value (sensor coordinate system) with respect to the environment information (the center of gravity of the person or the center point of the face of the person in the world coordinate system) to be less than a threshold value (specifically, minimum). Specifically, the sensor posture stabilization unit 404 generates an image sensor posture control command value to minimize the fluctuation of the posture of the image sensor 47 (i.e., posture of a head 43) with respect to the center of gravity of the person or the center point of the face of the person even when the posture of the person or the direction of the face fluctuates or even when the moving mechanism 44 fluctuates. The sensor posture stabilization unit 404 outputs the generated image sensor posture control command value to the image sensor posture control mechanism 46 to stabilize the posture of the image sensor 47.

According to this embodiment, the sensor posture stabilization unit 404 predicts the motion of the center of gravity of a person who is an object to be tracked or the center point of the face of the person, and generates the image sensor posture control command value to minimize the change in the predicted point and the posture of the image sensor 47. In particular, minimizing a relative posture change in the posture of the sensor relative to the center point of the face of the person rather than the center of gravity of the person reduces the observation noise of the image sensor 47, and it is expected that the recognition accuracy of the face, the facial expression, and the like is improved. This makes it possible to achieve facial recognition, bone estimation, and facial expression recognition while tracking a person who is performing large physical motion such as running, and to achieve imaging with less shake or blur.

In the fourth embodiment, the object-to-be-tracked motion prediction unit 405 is added to the configuration of the second embodiment. Instead of this configuration, it is also possible to add the object-to-be-tracked motion prediction unit 405 to the configuration of the third embodiment.

V. Fifth Embodiment

Figure 11:
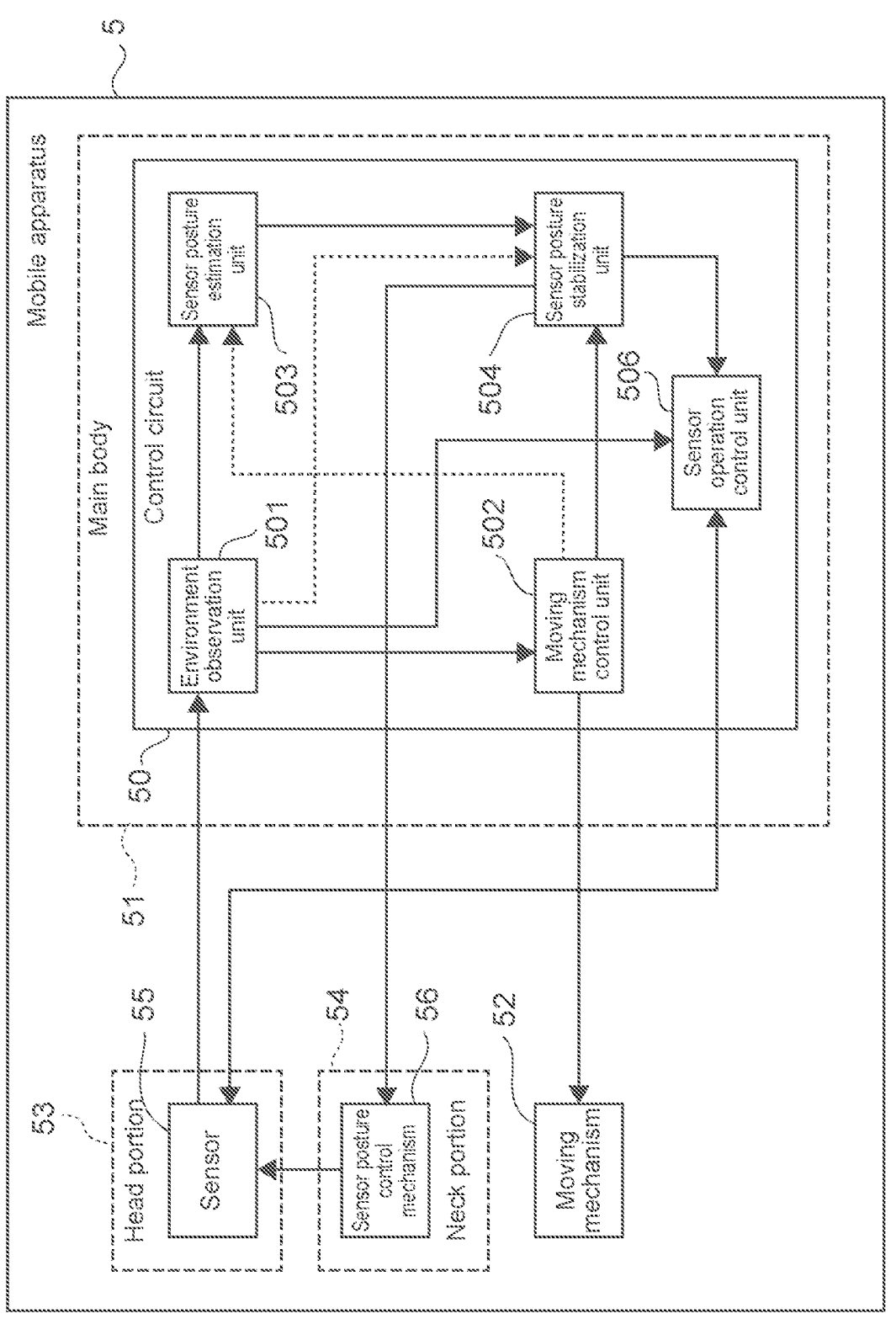
FIG. 11 shows a functional configuration of a mobile apparatus according to a fifth embodiment of the present disclosure.
Figure 12:
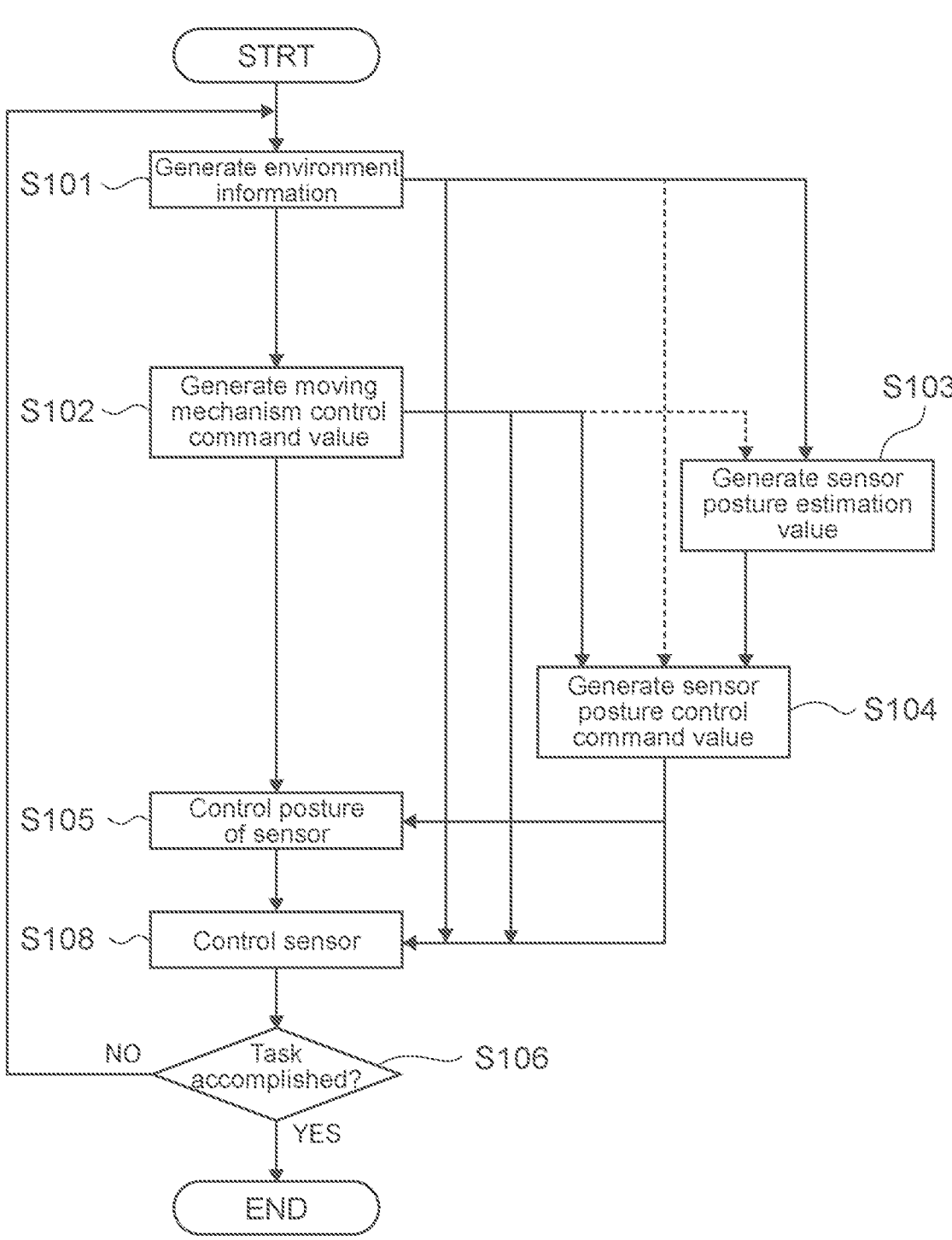
FIG. 12 shows an operation flow of the mobile apparatus.

FIG. 11 shows a functional configuration of a mobile apparatus according to a fifth embodiment of the present disclosure. FIG. 12 shows an operation flow of the mobile apparatus.

The fifth embodiment relates to a sensor operation control unit. The sensor operation control unit is applicable to any mobile apparatus according to the first embodiment to the fourth embodiment. As an example, an example in which the sensor operation control unit is applied to the mobile apparatus according to the first embodiment will be described. In other words, a mobile apparatus 5 of the fifth embodiment includes a sensor operation control unit 506 in addition to the configuration of the mobile apparatus 1 of the first embodiment.

The sensor operation control unit 506 temporarily stops sensing of a sensor 55 if the sensor posture stabilization unit 504 fails to generate a sensor posture control command value for setting a relative change of the sensor posture estimation value (sensor coordinate system) with respect to the environment information (world coordinate system) to be less than a threshold value (specifically, minimum) when a moving mechanism 52 is driven on the basis of the moving mechanism control command value (Step S108). In other words, if the posture of the sensor 55 is not stabilized (e.g., when wind is extremely strong, and when there are many obstacles on the ground) even when the posture of the sensor 55 is controlled, there is a possibility that the output of the sensor 55 contains a large amount of noise (noise is not completely absorbed), and thus the sensor operation control unit 506 temporarily stops the sensing of the sensor 55. Temporarily stopping the sensing of the sensor 55 includes skipping the timing of releasing the shutter or lowering the frame rate.

The sensor operation control unit 506 may determine that the sensor posture control command value fails to be generated, for example, if the sensor posture control command value generated by the sensor posture stabilization unit 504 (Step S104) is not for setting a relative change of the sensor posture estimation value to be less than a threshold value (minimum). Alternatively, the sensor operation control unit 506 may determine that the sensor posture control command value fails to be generated if the posture of the sensor 55 is not for setting a relative change to be less than the threshold value (if the changed posture of the sensor 55 is not stabilized) after a sensor posture control mechanism 56 is driven on the basis of the sensor posture control command value to change the posture of the sensor 55 (Step S105). Alternatively, the sensor operation control unit 506 may determine that the sensor posture control command value fails to be generated if it is determined that a relative change of the sensor posture estimation value fails to be less than the threshold value on the basis of the environment information generated by the environment observation unit 501 (Step S101) (e.g., when wind is extremely strong).

The sensor operation control unit 506 may be applied to the mobile apparatus 3 that can control the postures of the observation sensor 35 and the image sensor 37 as in the third embodiment. In this case, the sensor operation control unit 506 only needs to control the operation of the observation sensor 35 and the operation of the image sensor 37 independently.

In other words, the sensor operation control unit 506 only needs to temporarily stop sensing of the observation sensor 35 if the sensor posture stabilization unit 504 fails to generate an observation sensor posture control command value for setting a relative change of the sensor posture estimation value (sensor coordinate system) with respect to the environment information (world coordinate system) to be less than a threshold value (specifically, minimum) when the moving mechanism 32 is driven on the basis of the moving mechanism control command value (Step S108).

Meanwhile, the sensor operation control unit 506 only needs to temporarily stop sensing of the image sensor 37 if the sensor posture stabilization unit 504 fails to generate an image sensor posture control command value for setting a relative change of the sensor posture estimation value (sensor coordinate system) with respect to the environment information (world coordinate system) to be less than a threshold value (specifically, minimum) when the moving mechanism 32 is driven on the basis of the moving mechanism control command value (Step S108).

VI. Sixth Embodiment

Figure 13:
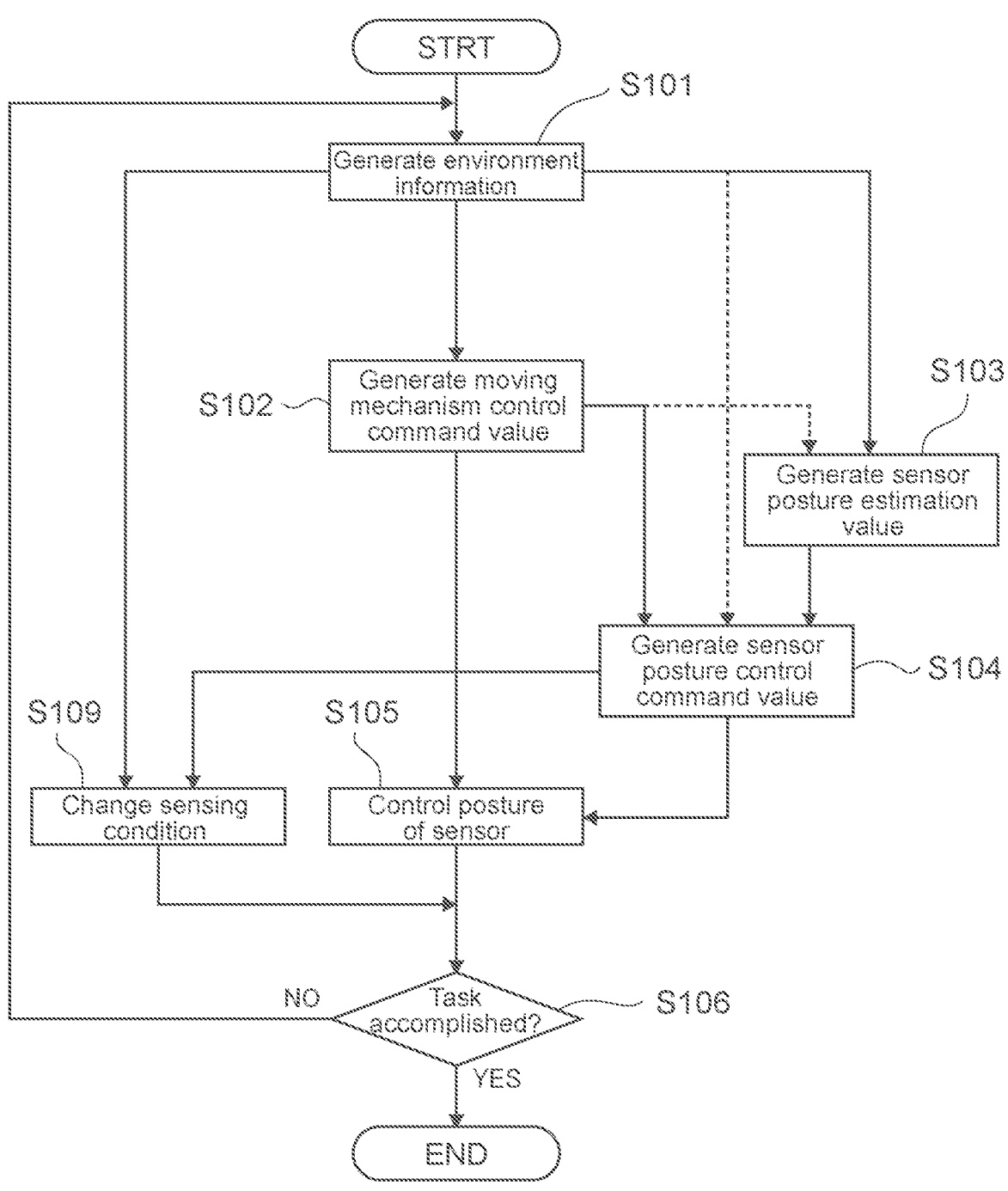
FIG. 13 shows an operation flow of a mobile apparatus according to a sixth embodiment of the present disclosure.

FIG. 13 shows an operation flow of a mobile apparatus according to a sixth embodiment of the present disclosure.

The functional configuration of the sixth embodiment is similar to the functional configuration of the mobile apparatus 5 of the fifth embodiment, and the illustration thereof will be omitted. In other words, the sixth embodiment also relates to a sensor operation control unit. The sensor operation control unit is applicable to any mobile apparatus according to the first embodiment to the fifth embodiment. As an example, an example in which the sensor operation control unit is applied to the mobile apparatus according to the first embodiment will be described.

In the sixth embodiment, the sensor operation control unit 506 changes a sensing condition of the sensor 55 if the sensor posture stabilization unit 504 fails to generate a sensor posture control command value for setting a relative change of the sensor posture estimation value (sensor coordinate system) with respect to the environment information (world coordinate system) to be less than a threshold value (specifically, minimum) when the moving mechanism 52 is driven on the basis of the moving mechanism control command value (Step S109). In short, the sensing of the sensor 55 is temporarily stopped (Step S108) in the fifth embodiment, whereas the sixth embodiment is different in that a sensing condition is changed.

In other words, if the posture of the sensor 55 is not stabilized (e.g., if wind is extremely strong, and if there are many obstacles on the ground) even when the posture of the sensor 55 is controlled on the basis of the sensor posture control command value, there is a possibility that the output of the sensor 55 contains a large amount of noise (noise is not completely absorbed), and thus the sensor operation control unit 506 changes the sensing condition (Step S109) and tries to control the sensor 55 under the changed sensing condition. The sensing condition is a condition other than the posture of the sensor 55 and relates to, for example, RGB, a parameter of a depth sensor or the like, a parameter of a time and a synchronization system, such as a timing of releasing a shutter or a frame rate, and an operation mode value such as a shutter speed or an exposure sensitivity.

The sensor operation control unit 506 may determine that the sensor posture control command value fails to be generated, for example, if the sensor posture control command value generated by the sensor posture stabilization unit 504 (Step S104) is not for setting a relative change of the sensor posture estimation value to be less than a threshold value (minimum). Alternatively, the sensor operation control unit 506 may determine that the sensor posture control command value fails to be generated if the posture of the sensor 55 is not for setting a relative change to be less than the threshold value (if the changed posture of the sensor 55 is not stabilized) after the sensor posture control mechanism 56 is driven on the basis of the sensor posture control command value to change the posture of the sensor 55 (Step S105). Alternatively, the sensor operation control unit 506 may determine that the sensor posture control command value fails to be generated if it is determined that a relative change of the sensor posture estimation value fails to be less than the threshold value on the basis of the environment information generated by the environment observation unit 501 (Step S101) (e.g., when wind is extremely strong).

The sensor operation control unit 506 may be applied to the mobile apparatus 3 that can control the postures of the observation sensor 35 and the image sensor 37 as in the third embodiment. In this case, the sensor operation control unit 506 only needs to control the operation of the observation sensor 35 and the operation of the image sensor 37 independently under different sensing conditions.

The present disclosure may include the following configurations.

(1)

A mobile apparatus, including:

a moving mechanism for moving in an automated manner in an environment;

a sensor that senses an object in the environment;

a sensor posture control mechanism that controls a posture of the sensor;

an environment observation unit that generates environment information on the basis of a sensing result of the sensor;

a moving mechanism control unit that generates, on the basis of the environment information, a moving mechanism control command value for controlling a motion of the moving mechanism and outputs the moving mechanism control command value to the moving mechanism to drive the moving mechanism;

a sensor posture estimation unit that estimates, on the basis of the environment information, the posture of the sensor when the moving mechanism moves in the environment to generate a sensor posture estimation value; and a sensor posture stabilization unit that generates, on the basis of the moving mechanism control command value, a sensor posture control command value for stabilizing the posture of the sensor to set a relative change of the sensor posture estimation value with respect to the environment information when the moving mechanism is driven on the basis of the moving mechanism control command value to be less than a threshold value, and outputs the sensor posture control command value to the sensor posture control mechanism to stabilize the posture of the sensor.

(2)

The mobile apparatus according to (1), in which the sensor posture estimation unit estimates the posture of the sensor further on the basis of the moving mechanism control command value.

(3)

The mobile apparatus according to (1) or (2), in which the sensor posture stabilization unit generates the sensor posture control command value further on the basis of the environment information.

(4)

The mobile apparatus according to any one of (1) to (3), in which the environment observation unit generates, as the environment information, a world coordinate system for a sensor coordinate system of the sensor, and/or position information of an object to be tracked existing in the environment.

(5)

The mobile apparatus according to any one of (1) to (4), further including a sensor operation control unit that temporarily stops sensing of the sensor or changes a sensing condition of the sensor if the sensor posture stabilization unit fails to generate the sensor posture control command value for setting the relative change to be less than the threshold value.

(6)

The mobile apparatus according to (5), in which the sensor operation control unit determines that the sensor posture control command value fails to be generated if it is determined that the relative change fails to be less than the threshold value on the basis of the environment information generated by the environment observation unit, if the sensor posture control command value generated by the sensor posture stabilization unit is not a value for setting the relative change to be less than the threshold value, or if a relative change of the posture of the sensor that is caused by the sensor posture control command value generated by the sensor posture stabilization unit is not less than the threshold value.

(7)

The mobile apparatus according to any one of (1) to (6), in which the sensor includes an observation sensor that senses the object necessary to generate the environment information, and an image sensor that senses an object to be tracked in the environment, the sensor posture control mechanism includes an image sensor posture control mechanism that controls a posture of the image sensor, the environment observation unit generates the environment information on the basis of a sensing result of the observation sensor, the sensor posture estimation unit estimates the posture of the image sensor when the mobile apparatus moves in the environment to generate a sensor posture estimation value of the image sensor, and the sensor posture stabilization unit generates, on the basis of the moving mechanism control command value, an image sensor posture control command value that is a sensor posture control command value for stabilizing the posture of the image sensor to set a relative change of the sensor posture estimation value of the image sensor with respect to the environment information to be less than a threshold value, and outputs the image sensor posture control command value to the image sensor posture control mechanism to stabilize the posture of the image sensor.

(8)

The mobile apparatus according to (7), in which the sensor posture control mechanism further includes an observation sensor posture control mechanism that controls a posture of the observation sensor, the sensor posture estimation unit further estimates the posture of the observation sensor when the mobile apparatus moves in the environment to generate a sensor posture estimation value of the observation sensor, and the sensor posture stabilization unit further generates, on the basis of the moving mechanism control command value, an observation sensor posture control command value that is a sensor posture control command value for stabilizing the posture of the observation sensor to set a relative change of the sensor posture estimation value with respect to the environment information to be less than a threshold value, and outputs the observation sensor posture control command value to the observation sensor posture control mechanism to stabilize the posture of the observation sensor.

(9)

The mobile apparatus according to any one of (1) to (8), in which the environment observation unit generates, on the basis of the sensing result of the observation sensor, position information of an object to be tracked existing in the environment as the environment information,
the mobile apparatus further includes
an object-to-be-tracked motion prediction unit that predicts a motion of the object to be tracked on the basis of the position information of the object to be tracked and generates object-to-be-tracked motion prediction information, and
the sensor posture stabilization unit generates the image sensor posture control command value further on the basis of the object-to-be-tracked motion prediction information and outputs the image sensor posture control command value to the image sensor posture control mechanism.

(10)
An information processing program that causes a control circuit of a mobile apparatus, the mobile apparatus including
a moving mechanism for moving in an automated manner in an environment,
a sensor that senses an object in the environment, and
a sensor posture control mechanism that controls a posture of the sensor,
to operate as:
an environment observation unit that generates environment information on the basis of a sensing result of the sensor;
a moving mechanism control unit that generates, on the basis of the environment information, a moving mechanism control command value for controlling a motion of the moving mechanism and outputs the moving mechanism control command value to the moving mechanism to drive the moving mechanism;
a sensor posture estimation unit that estimates, on the basis of the environment information, the posture of the sensor when the moving mechanism moves in the environment to generate a sensor posture estimation value; and
a sensor posture stabilization unit that generates, on the basis of the moving mechanism control command value, a sensor posture control command value for stabilizing the posture of the sensor to set a relative change of the sensor posture estimation value with respect to the environment information when the moving mechanism is driven on the basis of the moving mechanism control command value to be less than a threshold value, and outputs the sensor posture control command value to the sensor posture control mechanism to stabilize the posture of the sensor.

(11)
An information processing method that is performed by a mobile apparatus including
a moving mechanism for moving in an automated manner in an environment,
a sensor that senses an object in the environment, and
a sensor posture control mechanism that controls a posture of the sensor,
the information processing method including:
generating environment information on the basis of a sensing result of the sensor;
generating, on the basis of the environment information, a moving mechanism control command value for controlling a motion of the moving mechanism and outputting the moving mechanism control command value to the moving mechanism to drive the moving mechanism;

estimating, on the basis of the environment information, the posture of the sensor when the moving mechanism moves in the environment to generate a sensor posture estimation value; and
generating, on the basis of the moving mechanism control command value, a sensor posture control command value for stabilizing the posture of the sensor to set a relative change of the sensor posture estimation value with respect to the environment information when the moving mechanism is driven on the basis of the moving mechanism control command value to be less than a threshold value, and outputting the sensor posture control command value to the sensor posture control mechanism to stabilize the posture of the sensor.

The embodiments and modified examples of the present technology have been described above, but the present technology is not limited to the embodiments described above and can be variously modified without departing from the gist of the present technology.

REFERENCE SIGNS LIST 1 mobile apparatus
10 control circuit
101 environment observation unit
102 moving mechanism control unit
103 sensor posture estimation unit
104 sensor posture stabilization unit
11 main body
12 moving mechanism
13 head portion
15 sensor
16 sensor posture control mechanism

The invention claimed is:
1. A mobile apparatus, comprising:
a moving mechanism configured to automatically move the mobile apparatus in an environment;
a sensor configured to:
sense an object in the environment; and
determine a sensing result based on the sensed object;
a sensor posture control mechanism configured to control a posture of the sensor; and
a central processing unit (CPU) configured to:
generate environment information based on the sensing result;
generate, based on the environment information, a moving mechanism control command value;
output the moving mechanism control command value to the moving mechanism to drive the moving mechanism, wherein a motion of the mobile apparatus, in the environment, is based on the moving mechanism control command value;
determine, based on the environment information, the posture of the sensor at a time of the motion of the mobile apparatus in the environment;
generate a sensor posture estimation value based on the posture of sensor;
generate, based on a basis of the moving mechanism control command value, a sensor posture control command value, wherein
the sensor posture control command value is associated with stabilization of the posture of the sensor,
the stabilization of the posture of the sensor is associated with to set a relative change of the sensor posture estimation value, the relative change of the sensor posture estimation value is less than a first threshold value, the generation of the environment information is at the time of the motion of mobile apparatus in the environment, and the sensor posture estimation value is based on the generated environment information; and output the sensor posture control command value to the sensor posture control mechanism to stabilize the posture of the sensor.

2. The mobile apparatus according to claim 1, wherein the CPU is further configured to determine the posture of the sensor based on the moving mechanism control command value.

3. The mobile apparatus according to claim 1, wherein the CPU is further configured to generate the sensor posture control command value based on the environment information.

4. The mobile apparatus according to claim 1, wherein the CPU is further configured to generate, as the environment information, at least one of a world coordinate system associated with a sensor coordinate system of the sensor, or position information of the object the environment.

5. The mobile apparatus according to claim 1, wherein the CPU is further configured to determine a failure of generation of the sensor posture control command value; and the CPU is further configured to one of:

temporarily stop the determination of the sensing result; or change a sensing condition of the sensor based on the determined failure of generation of the sensor posture control command value.

6. The mobile apparatus according to claim 5, wherein the CPU is further configured to:

determine, based on the environment information, that the relative change of the sensor posture estimation value is greater than the first threshold value; and determine the failure of generation of the sensor posture control command value based on at least one of the determination that the relative change of the sensor posture estimation value is greater than the first threshold value, the sensor posture control command value is not a value to set the relative change of the sensor posture estimation value less than the first threshold value, or a relative change value of the posture of the sensor that is greater than the first threshold value, wherein the relative change value is based on the sensor posture control command value.

7. The mobile apparatus according to claim 1, wherein the sensor includes:

an observation sensor configured to sense the object to determine the sensing result, and an image sensor configured to sense the object in the environment, the sensor posture control mechanism includes an image sensor posture control mechanism configured to control a posture of the image sensor, the CPU is further configured to:

generate the environment information based on the sensing result;

determine a posture of the image sensor at the time of motion of the mobile apparatus in the environment;

generate, based on the posture of the image sensor, a sensor posture estimation value of the image sensor; and generate, based on the moving mechanism control command value, an image sensor posture control command value, wherein the image sensor posture control command value corresponds to the sensor posture control command value, the image sensor posture control command value is associated with stabilization of the posture of the image sensor, the stabilization of the posture of the image sensor is associated with a relative change of the sensor posture estimation value of the image sensor, the relative change of the sensor posture estimation value of the image sensor is less than a second threshold value, and the relative change of the sensor posture estimation value of the image sensor is based on the environment information; and output the image sensor posture control command value to the image sensor posture control mechanism to stabilize the posture of the image sensor.

8. The mobile apparatus according to claim 7, wherein the sensor posture control mechanism further includes an observation sensor posture control mechanism configured to control a posture of the observation sensor, the CPU is further configured to:

determine the posture of the observation sensor at the time of the motion of the mobile apparatus in the environment;

generate, based on the posture of the observation sensor, a sensor posture estimation value of the observation sensor, and generate, based on the moving mechanism control command value, an observation sensor posture control command value, wherein the observation sensor posture control command value corresponds to the sensor posture control command value, the observation sensor posture control command value is associated with stabilization of the posture of the observation sensor, the stabilization of the posture of the observation sensor is associated with a relative change of the sensor posture estimation value of the observation sensor, relative change of the sensor posture estimation value of the observation sensor is less than a third threshold value, and the relative change of the sensor posture estimation value of the observation sensor is based on the environment information; and output the observation sensor posture control command value to the observation sensor posture control mechanism to stabilize the posture of the observation sensor.

9. The mobile apparatus according to claim 7, wherein the CPU is further configured to:

generate, based on the sensing result of the observation sensor, position information of the object in the environment as the environment information, determine a motion of the object based on the position information;

generate, based on the motion of the object, object-to-be-tracked motion prediction information; and generate the image sensor posture control command value based on the object-to-be-tracked motion prediction information; and output the image sensor posture control command value to the image sensor posture control mechanism.

10. A non-transitory computer-readable medium having stored thereon, computer-executable instructions which, when executed by a computer, cause the computer to execute operations, the operations comprising:

automatically moving a mobile apparatus in an environment;

sensing, by a sensor, an object in the environment;

determining a sensing result based on the sensed object;

controlling a posture of the sensor;

generating environment information based on the sensing result;

generating, based on the environment information, a moving mechanism control command value;

outputting the moving mechanism control command value to a moving mechanism to drive the moving mechanism, wherein a motion of the mobile apparatus, in the environment, is based on the moving mechanism control command value;

determining, based on the environment information, the posture of the sensor at a time of the motion of the mobile apparatus in the environment;

generating a sensor posture estimation value based on the posture of sensor;

generating, based on the moving mechanism control command value, a sensor posture control command value, wherein the sensor posture control command value is associated with stabilization of the posture of the sensor, the stabilization of the posture of the sensor is associated with a relative change of the sensor posture estimation value, the relative change of the sensor posture estimation value is less than a threshold value, the generation of the environment information is at the time of the motion of mobile apparatus in the environment, and the sensor posture estimation value is based on the generated environment information; and outputting the sensor posture control command value to a sensor posture control mechanism to stabilize the posture of the sensor.

11. An information processing method, comprising:

in a mobile apparatus:

automatically moving the mobile apparatus in an environment;

sensing, by a sensor, an object in the environment;

determining a sensing result based on the sensed object;

controlling a posture of the sensor;

generating environment information based on the sensing result;

generating, based on the environment information, a moving mechanism control command value;

outputting the moving mechanism control command value to a moving mechanism to drive the moving mechanism, wherein a motion of the mobile apparatus, in the environment, is based on the moving mechanism control command value;

determining, based on the environment information, the posture of the sensor at a time of the motion of the mobile apparatus in the environment;

generating a sensor posture estimation value based on the posture of sensor;

generating, based on the moving mechanism control command value, a sensor posture control command value, wherein the sensor posture control command value is associated with stabilization of the posture of the sensor, the stabilization of the posture of the sensor is associated with a relative change of the sensor posture estimation value, relative change of the sensor posture estimation value is less than a threshold value, the generation of the environment information is at the time of the motion of mobile apparatus in the environment, and the sensor posture estimation value is based on the generated environment information; and outputting the sensor posture control command value to a sensor posture control mechanism to stabilize the posture of the sensor.

* * * * *